(12) United States Patent
Watkins et al.

(10) Patent No.: US 11,051,127 B2
(45) Date of Patent: Jun. 29, 2021

(54) COMMUNICATIONS HUB FOR CRASH EVENT DETECTION, RESPONSE, AND REPORTING SYSTEM

(71) Applicant: Mobile Video Computing Solutions Holdings LLC, Troy, MI (US)

(72) Inventors: D Scott Watkins, Huntington Woods, MI (US); Craig A Tieman, Westfield, IN (US); Michael Dunham, St. Croix, VI (US); Richard Grelck, Plover, WI (US)

(73) Assignee: Mobile Video Computing Solutions Holdings LLC, Troy, MI (US)

( * ) Notice: Subject to any disclaimer, the term of this patent is extended or adjusted under 35 U.S.C. 154(b) by 0 days.

(21) Appl. No.: 16/809,393

(22) Filed: Mar. 4, 2020

(65) Prior Publication Data

US 2020/0267503 A1    Aug. 20, 2020

Related U.S. Application Data

(63) Continuation-in-part of application No. 16/425,697, filed on May 29, 2019, now Pat. No. 10,623,899, which is a continuation of application No. 15/875,949, filed on Jan. 19, 2018, now abandoned, which is a continuation of application No. 15/435,265, filed on Feb. 16, 2017, now Pat. No. 9,913,099, which is a continuation-in-part of
(Continued)

(51) Int. Cl.
| | |
|---|---|
| *H04W 4/90* | (2018.01) |
| *H04W 4/02* | (2018.01) |
| *G06Q 40/08* | (2012.01) |
| *H04W 4/44* | (2018.01) |
| *H04W 4/029* | (2018.01) |
| *H04W 4/46* | (2018.01) |

(52) U.S. Cl.
CPC ............ *H04W 4/027* (2013.01); *G06Q 40/08* (2013.01); *H04W 4/029* (2018.02); *H04W 4/44* (2018.02); *H04W 4/46* (2018.02); *H04W 4/90* (2018.02)

(58) Field of Classification Search
CPC .......... G07C 5/008; G06Q 40/08; H04W 4/22
See application file for complete search history.

(56) References Cited

U.S. PATENT DOCUMENTS

| | | | |
|---|---|---|---|
| 2015/0024705 A1* | 1/2015 | Rashidi | G08B 13/19669 455/404.2 |
| 2015/0035665 A1* | 2/2015 | Plante | B60K 35/00 340/438 |

\* cited by examiner

*Primary Examiner* — Sam Bhattacharya
(74) *Attorney, Agent, or Firm* — Baker Donelson; Carl M. Davis, II

(57) ABSTRACT

A communications hub providing a repository of vehicle crash information communicated by a mobile communications device and of vehicle crash data records provided by crash event servicers, in a crash detection, response and reporting system that determines a possible crash event by periodically evaluating (a) changes in a motion signal and (b) crash sound indicators of one or more of (i) motor vehicle glass breakage, (ii) metal folding, (iii) contact thud, and (iv) tires screeching, and upon a failure to respond within a predetermined period to a notice of possible crash event, communicating an identifier and crash incident information to a dispatch center as first notice of loss for dispatching a response servicer and maintaining the repository to facilitate resolution of the claims arising from the vehicle crash event.

42 Claims, 11 Drawing Sheets

Related U.S. Application Data application No. 14/819,879, filed on Aug. 6, 2015, now Pat. No. 9,628,975.

(60) Provisional application No. 62/034,247, filed on Aug. 7, 2014, provisional application No. 62/034,070, filed on Aug. 6, 2014.

COMMUNICATIONS HUB FOR CRASH EVENT DETECTION, RESPONSE, AND REPORTING SYSTEM

TECHNICAL FIELD

The present invention relates to apparatus and methods for responding to motor vehicle crash events. More particularly, the present invention relates to data collection and communications management for motor vehicle crash event claims resolution with first notice of loss upon detecting the occurrence of a motor vehicle crash and responding and reporting the detection of the motor vehicle crash.

BACKGROUND OF THE INVENTION

In recent years, improved roadways, traffic control devices, and safety devices that are installed and operated in motor vehicles have resulted in safer transportation by motor vehicle. Nevertheless, incidents and accidents involving car and truck motor vehicles continue to occur. These include vehicle-to-vehicle collisions as well as single vehicle accidents. While typically such incidents occur in locations where response personnel may be readily directed to provide medical and tow services, some incidents involving disappearance of the motor vehicle and its operation occur (such as a single vehicle accident in which the vehicle leaves the roadway and becomes hidden from view in woods or water).

Also, monitoring services seek "how am I driving" reports typically for fleet operators to monitor driving activities of vehicle operators but parents having children as new or inexperienced drivers also have become interested in monitoring and reporting on motor vehicle operations.

While systems having GPS location tracking features and cellular telecommunications devices have been installed in motor vehicles for communications between occupants and a tracking service provider, there are drawbacks to such systems. The operator may be injured or blocked from initiating communications. Also, the operator may be using a different vehicle such as a rental vehicle.

Generally, motor vehicle accidents, whether of a single driver or of two or more drivers, can be grouped as involving (i) low-speed, low-impact accidents and (ii) higher-speed, higher-impact accidents. A low-speed, low-impact accident may occur in parking lots or even some roadway events. The motor vehicles involved generally remain drivable, and drivers drive-away after an exchange of identification and insurance information, and with, or sometimes without, a police response and investigation. Damages for property damage and personal injury in such events are typically resolved through assistance by the driver's insurance adjuster providing coordination of repair centers, interim rental replacement vehicles, and personal injury resolution.

Other accidents however, such as higher speed or higher impact crash events, require responses by appropriate responders including police, emergency medical, and tow truck operators for accident investigation, medical care, and vehicle pull-outs such as from ditches or off-road sites and for towing damaged un-drivable vehicles to an impound lot or storage site pending disposition of the vehicle. Resolution of property damage, personal injury, and financial damages from such serious motor vehicles accidents, whether of a single driver or of two or more drivers, involve more persons and interacting agencies than just the driver(s). These persons and agencies include the insured policyholders and respective insurance providers, but also include personal relatives, employer, fleet vehicle operators of a vehicle involved in the crash event, tow dispatch and responding servicers, and repair and salvage facilities. The occurrence of a motor vehicle accident typically leads to activities by these other persons and agencies s to address and resolve the damages and losses arising from the accident.

The insurer and fleet operator (if such vehicle were involved) typically receive notice of loss from the insured, and for low-speed drive-away accidents, such notice may be made some extended period afterward. Often the damages and costs for resolution in such events are relatively low. However, in the more serious events such as a crash accident requiring dispatch and use of tow trucks, early notice of loss to the insurer and fleet operator is more important. The property damage and personal injuries may be significant. The insurance provider and fleet operators in such crash events may seek accident and damages information including on-site inspections for evaluating liability responsibilities, receive and collect documentary materials such as accident reports, injury and medical care invoices, vehicle damage inspection and repair/salvage evaluations, as well as providing claims adjustment services.

Adjustment services balance the needs of the policyholder and the insurance carrier to make the policyholder whole yet minimize the costs and expenses involved in reaching resolution of the damages. The adjustment service involves the collection and evaluation of large amounts of documents and data from the various sources engaged in accident resolution. The drivers may provide oral and written statements to the insurer and to attorneys if the matter become litigious. Damaged vehicles are inspected, and repaired, at automotive repair body shops with documented estimates providing a basis for repairs. In efforts to control costs and streamline the repair process, some insurers suggest policyholders use insurer-approved repair facilities and accept use of after-market replacement parts (subject to warranties to the policyholder as to quality and reliability). In circumstances involving towed vehicles, the towing companies maintain information as to vehicle location and disposition, with movement and storage of the vehicle subject to approvals of the vehicle owner. Evaluations may lead to a finding that the vehicle is not economically repairable, and the vehicle may be designated for salvage. In the interim, rental vehicles incur costs covered by the insurer or vehicle owner. The insurers seek timely and quick dispositions to reduce costs and expenses arising from the adjustment and resolution of the damages from the crash event. In some circumstances, investigators inspect crash event sites and vehicles to collect accident information as to possible causes and damages. Also, various government agencies may seek crash event information such as for evaluating motor vehicle defects and to improve vehicle and driver/occupant safety in travel. Communications and documentation involved in after-event information collection and event resolution include written documents and correspondence, more recently in electronic form such as emails, voicemail recordings, police and other investigator reports, images of the crash event site and vehicles including still frame photographs (electronic and paper) and video, relevant components of or the actual motor vehicle itself, and other information, evidence, and reports relating to the crash event.

Accordingly, there is a need in the art for an integrated system and method for data collection and communications management for motor vehicle crash event claims resolution with first notice of loss upon detecting the occurrence of a motor vehicle crash and responding and reporting the detection of the motor vehicle crash. It is to such that the present invention is directed.

BRIEF SUMMARY OF THE INVENTION

The present invention meets the needs in the art by providing a communications hub providing a repository for resolution of undrivable motor vehicle crash events, comprising a plurality of mobile communications devices, each associated with a respective one of the plurality of drivers and configured with a sensor that generates a motion signal responsive to motion of the mobile communications device and a sound receiver for receiving a sound signal of sound proximate the mobile communications device. The mobile communications device configured with software instructions that upon execution monitors for an occurrence of a crash event by periodically interrogating (a) the motion signal to determine whether a change in motion exceeds a predetermined motion threshold and or (b) the sound signal to determine whether a sequence of sensed sound signals within a predetermined period matches crash sound indicators of one or more of (i) glass breakage, (ii) metal folding, (iii) contact impact, and (iv) tires screeching. Each mobile communications device comprising a display that upon determining the occurrence of the crash incident displays a possible event window for selection of one of (a) to return the mobile communications device to monitoring for the occurrence of the crash incident and (b) to confirm the crash incident. The mobile communications device, upon (a) confirmation of the crash incident or (b) upon a failure of selection of one of the selectable options within a predetermined period, the mobile communications device communicating by a communications network an identifier associated with the mobile communications device and crash incident information of a location data, date and time to the tracking and dispatch center. The tracking and dispatch center having a computer processor configured with an electronic memory device that maintains driver information of driver name, address, insurance servicer and policy number for each of the plurality of drivers and further comprising for each mobile communications device a repository of: (i) vehicle crash incident information communicated by the mobile communications device and associated with a motor vehicle; and (ii) one or more vehicle crash data records, each said vehicle crash record containing data provided by one of a plurality of crash event servicers. The plurality of crash event servicers comprising (a) at least one response servicer for dispatching by the tracking and dispatch center to a site of the crash incident based on the location data, the response servicer providing an imaging device and a communications device, whereby images received by the imaging device communicate by the communications device through the network to the tracking and dispatch center for recording in the repository; and (b) a claims servicer that receives from the tracking and dispatch center notice of the identifier and crash incident information, the claims service center configured for servicing an insurance claim arising from the crash event using the vehicle crash incident information and the vehicle crash data records communicated to the tracking and dispatch center and recorded in the repository.

In another aspect, the present invention is directed to a comprehensive crash event and claims servicing system, comprising a telecommunications network and a communications hub having a transceiver for receiving and communicating through the network crash event information from at least one crash event servicer and maintaining said crash event information in an electronic database operatively engaged with the communications hub. A crash event notifier communicates a notice of a possible crash event to the communications hub to initiate a crash event file for maintaining the crash event information associated with the crash event. The crash event notifier comprises one of a crash event detector device, a crash event SDK imbedded in a consumer software application operated by an insurance carrier, a motor club servicer, a cell phone network provider, a motor vehicle OEM monitoring servicer, a telecommunications report, a towing dispatch servicer, and a towing service provider (private or municipal). The crash event file associated with an identifier associated with the notice of the crash event, whereby said information is accessible for resolution of personal and property claims arising from the crash event.

In another aspect, the present invention provides a method of resolving claims arising from undrivable motor vehicle crash events via a communications hub repository service, comprising the steps of:
(a) providing a plurality of mobile communications devices, each associated with a respective one of the plurality of drivers and configured with a sensor that generates a motion signal responsive to motion of the mobile communications device and a sound receiver for receiving a sound signal of sound proximate the mobile communications device;
(b) configuring the mobile communications device with software instructions that upon execution monitors for an occurrence of a crash event by periodically interrogating (i) the motion signal to determine whether a change in motion exceeds a predetermined motion threshold and or (b) the sound signal to determine whether a sequence of sensed sound signals within a predetermined period matches one or more crash sound indicators of (i) glass breakage, (ii) metal folding, (iii) contact impact, and (iv) tires screeching;
(c) upon determining by a respective mobile communications device the occurrence of the crash incident, displaying thereon a possible event window for selection of one of (i) to return the mobile communications device to monitoring for the occurrence of the crash incident and (ii) to confirm the crash incident;
(d) upon (i) confirmation of the crash incident or (ii) upon a failure of selection of one of the selectable options within a predetermined period, communicating by the mobile communications device within a communications network an identifier associated with the mobile communications device and crash incident information of a location data, date and time to a tracking and dispatch center having a computer processor configured with an electronic memory device that maintains driver information of driver name, address, insurance servicer and policy number for each of the plurality of drivers;
(e) receiving and storing in a repository of the tracking and dispatch center,
vehicle crash incident information communicated by the mobile communications device and associated with the motor vehicle; and
one or more vehicle crash data records, each said vehicle crash record containing data provided by one of a plurality of crash event servicers;
the plurality of crash event servicers comprising:
(i) at least one response servicer for dispatching by the tracking and dispatch center to a site of the crash incident based on the location data, the response servicer providing an imaging device and a communications device; and (ii) a claims servicer;

(f) communicating by the communications device images received by the imaging device through the network to the tracking and dispatch center for recording in the repository; and (g) servicing by the claims service center an insurance claim arising from the crash event using the vehicle crash incident information and the vehicle crash data records communicated to the tracking and dispatch center and recorded in the repository.

In yet another aspect, the present invention provides a method of servicing claims with a comprehensive crash event and claims servicing system, comprising the steps of:

(a) providing a telecommunications network;

(b) establishing a communications hub with a transceiver for receiving and communicating through the network crash event information from at least one crash event servicer and maintaining said crash event information in an electronic database operatively engaged with the communications hub;

(c) communicating from a crash event notifier upon determination of a crash event, notice of the crash event to the communications hub to initiate a crash event file for maintaining the crash event information associated with the crash event, said crash event file associated with an identifier associated with the notice of the crash event, wherein the crash event notifier comprises one of a crash event detector device, a crash event SDK imbedded in a consumer software application operated by an insurance carrier, a motor club servicer, a cell phone network provider, a motor vehicle OEM monitoring servicer, a telecommunications report, a towing dispatch servicer, and a towing service provider (private or municipal); and (d) providing access to said crash event information for resolution of personal and property claims arising from the crash event.

Objects, advantages, and features of the present invention may be readily determined upon a reading of the following detailed description in conjunction with the drawings and the appended claims.

DETAILED DESCRIPTION

Figure 1:
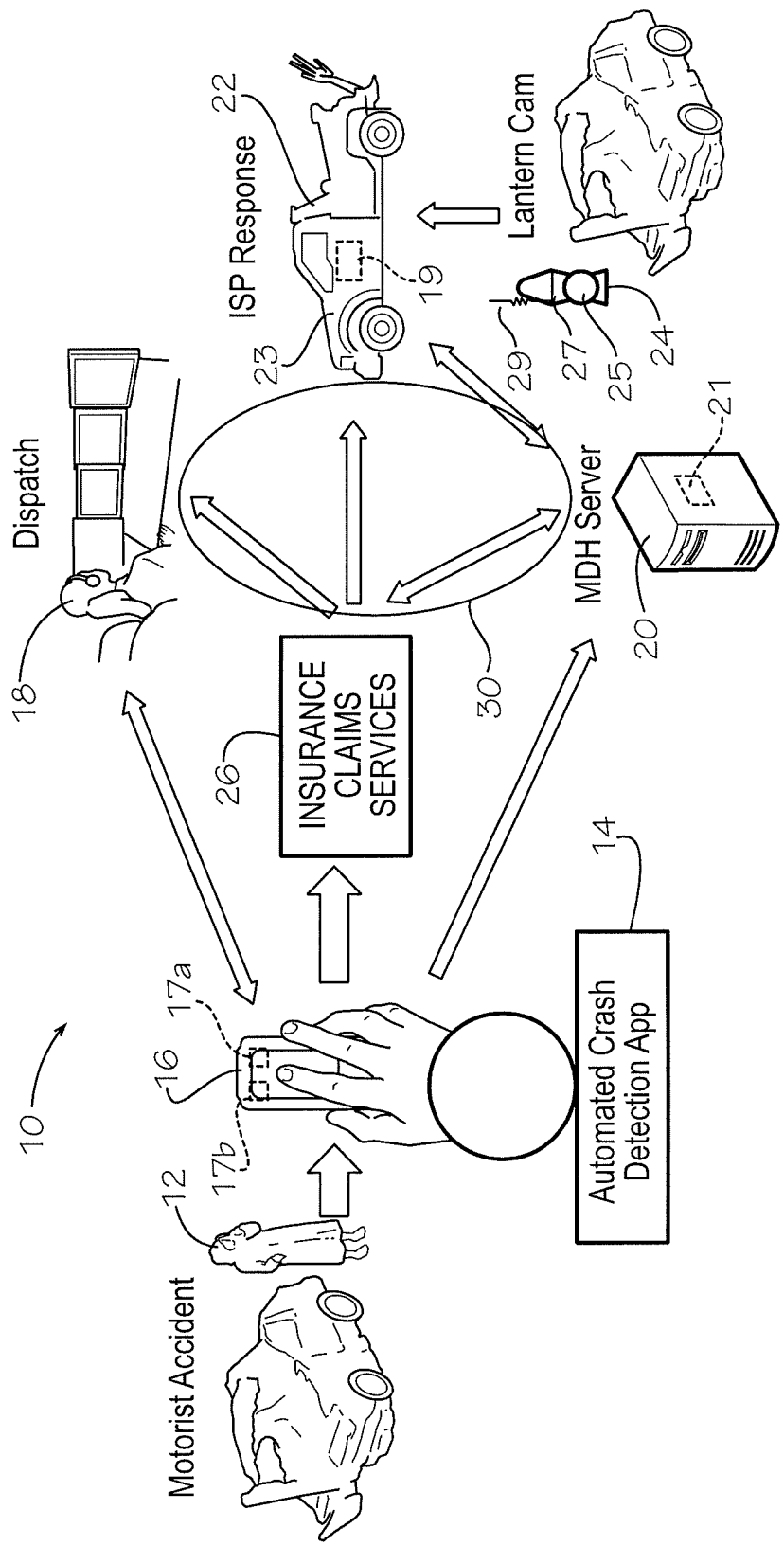
FIG. 1 illustrates a schematic overview of an illustrative embodiment of a crash detection, response, and reporting apparatus in accordance with the present invention.

With reference to the drawings, in which like parts have like reference numerals, FIG. 1 illustrates a schematic overview of an illustrative embodiment of a crash detection, response, and reporting apparatus 10 in accordance with the present invention. The apparatus 10 supports motor vehicle insurance and tracking services for drivers of motor vehicles 12 with a computer software application 14 configured for crash detection, response and reporting operable on a mobile communications device 16. The mobile communications device 16 includes a microprocessor device, communications module, and display. The mobile communications device includes, but is not limited to cellular telephone, tablet computer, laptop portable computer, or other similar microprocessor device configured with an operating system, information input devices (mouse, keyboard, touchscreen, actual or virtual), and a display device for presentation of information during operation of the application. For example, the possession of cellular telephones is becoming more prevalent. The application 14 resident on the cellular telephone in the possession of the driver during motor vehicle operation, and operating in a background mode, provides a passively present crash detection, response, and reporting feature for drivers as well as others having an interest in the status of the driver and the motor vehicle. The mobile communications device 16 includes conventionally an accelerometer 17a for detecting changes in linear acceleration and alternatively a gyroscope 17b (one or more axis) configured for detecting changes in angular rotation of the device. The accelerometer 17a and the gyroscope 17b detect changes in motion of the mobile communications device and thus may indicate changes in the status of the motor vehicle (i.e., especially a potential crash based on rapid changes in acceleration and/or rapid changes in angular rotation). The application 14 periodically interrogates and determines changes in motion of the mobile communications device (acceleration and/or angular rotation) by communicating with, and receiving one or more motion signals from, the accelerometer 17a and from the gyroscope 17b. In an alternate embodiment, the accelerometer 17a and/or gyroscope 17b may be a separate device installed in the motor vehicle, which communicate with the mobile communications device 16.

The apparatus 10 includes a central tracking/dispatch center 18, with a computer server or processor 20. The computer server 20 includes conventional memory or storage devices and is configured for maintaining (adding, updating, revising) a database 21 with information retained on the storage device. The database 21 of the tracking/dispatch center 18 receives and stores the motion information and the sound signals on which the crash incident was determined, upon communication from the mobile communications device of such information and signals through a communications network. Further, the database maintains driver information of driver name, address, insurance company and policy number for a plurality of drivers and maintains vehicle crash information of motor vehicle, crash location data, date and time, and optionally one or more sequences of sounds from a crash location, one or more images thereof, for a plurality of crashed motor vehicles. The computer server 20 is further configured for analyzing and reporting on the status of motor vehicles having information tracked though the database of the central tracking/dispatch center 18.

The apparatus 10 includes one or more response services. These may be independent service providers or dependent providers related to the central tracking/dispatch center 18. The illustrated embodiment includes a plurality of tow truck service/features 22 as a response service. The response service includes a tow truck 22 and a portable lantern camera/communications device 24. The portable lantern device 24 includes a high-wattage light 25, a camera 27, and a communications device 29. The light 25 is selectively operable for night illumination. The camera 27 operates in video or still modes for imaging of the crash event, the site, the motor vehicle(s) involved, and creating other picture documentation related to the crash event. The communications device 29 provides two-way communications, such as cellular, WIFI, radio, or other, for communicating with the persons involved in the crash event, with the central tracking/dispatch center 18, with the tow service provider, or others as appropriate. Live images may be transmitted as appropriate, for example, but not limited to emergency care and services providers or the dispatcher 18. In the illustrated embodiment, the tow truck 23 optionally includes digital video recording and telecommunications equipment 19 (i.e. MDVR and multiple cameras) for communicating images to the server 20, as well as capturing multiple video images from the tow truck and from the portable lantern camera 24 that communicates with and through the telecommunications equipment. In yet another alternate embodiment, the lantern camera/MDVR 24 provides the on-site imaging functionality and there is no MDVR equipment mounted on the truck except for other wireless cameras carried, for example, in the truck or by other responders, which communicate through the lantern camera/MDVR 24 to the server 20. In an alternate embodiment, the portable lantern device 24 may be embodied in mobile communications device such as a cellphone equipped with a light emitting device, a video imager, and a transceiver device for cellular network communications, and a microprocessor. The microprocessor is configured with a software application for selectively activating the imager for receiving images (video or separate image) of a crash site, storing the images and selectively communicating the images through the network to receiver. The light provides lighting for night activities at a crash site.

The apparatus 10 further includes a claims servicer 26 that provides motor vehicle claims information and processing services to insurance carriers and motor vehicle owners and operators such as fleet operators.

The application 14, dispatch 18, ISP (independent service provider) 22, and the insurance claims servicer 26 communicate through a communications network generally 30 including wireless, cellular, telephony, radio (two-way), world wide web communications devices and connections, and other suitable electronic communications devices.

The server 20 is configured with the database 21 for tracking motor vehicles and drivers registered with the service, through a fleet operator, an insurance company as a service for its insured, or independently such as parents of young drivers. Further, the apparatus 10 may gainfully be used by a fleet operator as an independent separate system.

Figure 2:
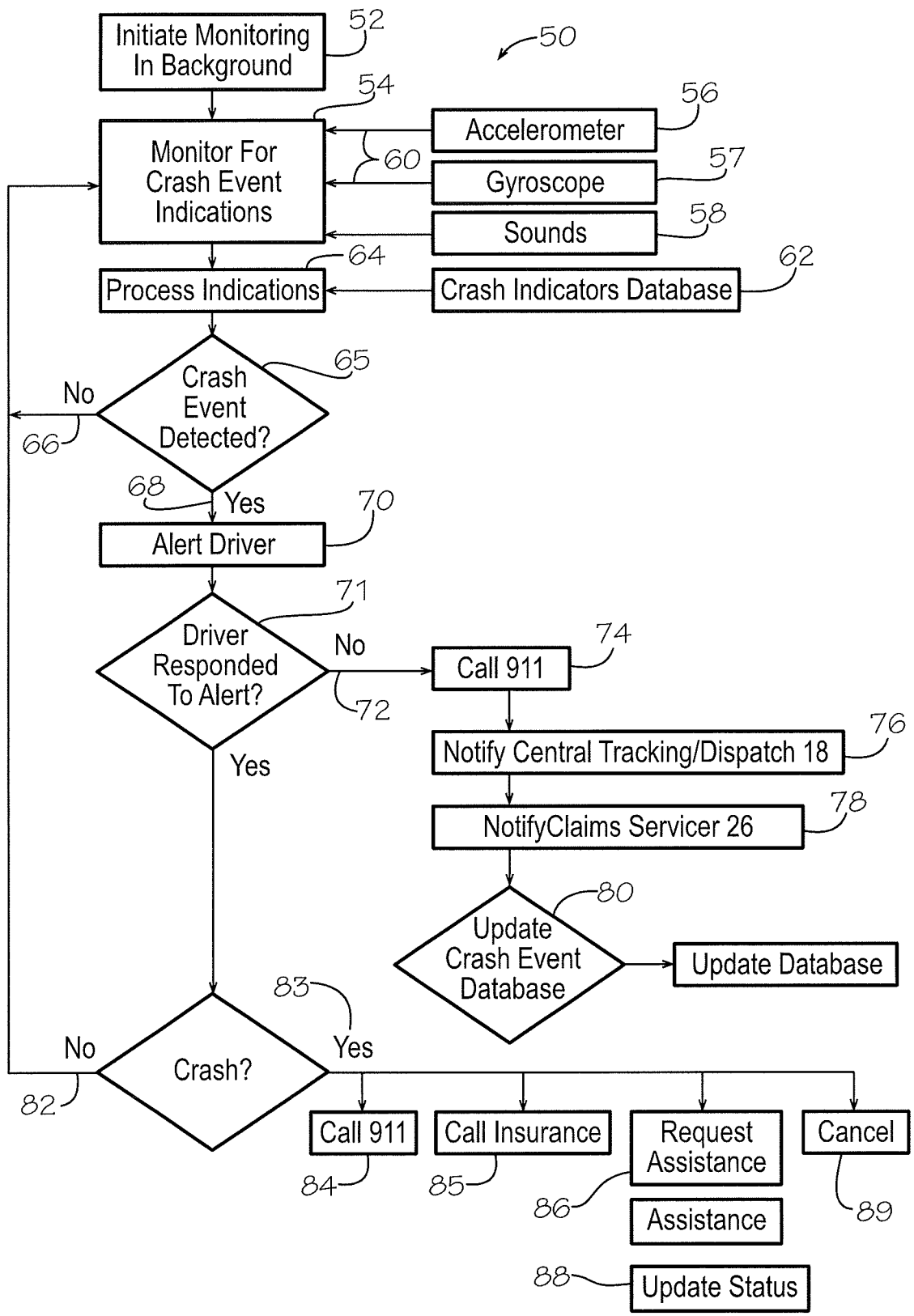
FIG. 2 illustrates a process flow of an exemplary embodiment of an application for a mobile computer device configured for crash detection, response and reporting in accordance with the present invention.

FIG. 2 illustrates a process flow 50 of an exemplary embodiment of the application 14 operable with the mobile communications device 16 for crash detection, response and reporting in accordance with the present invention. The driver initiates 52 operation of the application 14. The application 14 may operate in a background mode of the mobile communications device so that other routine uses of the mobile communications device 16 (such as cellphone calls, internet access, email receiving and transmitting, mapping and routing directions, and other conventional uses) may proceed.

The application 14 monitors 54 for indicators of a crash event. In the illustrative embodiment, detection of motion above a preset speed causes the application 14 to commence the crash detection monitoring functions. The mobile communications device 16 includes conventionally the accelerometer 17a, and the application 14 periodically interrogates the accelerometer by communicating with, and receiving an acceleration signal from, the accelerometer. An alternate embodiment includes the gyroscope 17b that detects changes in angular rotation. The application 14 in this embodiment periodically interrogates the gyroscope 17b for receiving angular rotation signals indicating rapid rotation of the mobile communication device (for example, rolling over of a motor vehicle). The mobile communications device 16 includes a sound receiver or microphone.

The crash indicators include the motor vehicle motion signal and the sounds 58 received proximate the mobile communications device 16. The motion signal may be the acceleration 56 signals, the angular rotation signals 57, or both. The application 14 periodically receives 60 the motion information of the motor vehicle from the force monitoring device or accelerometer and alternatively the angular rotation signals 57 from the angular rotation measuring device. The application 14 also receives audio signals though the microphone. The audio signals include crash sounds which more particularly include glass breakage, metal folding, contact impact sound—a "thud" of vehicle-to-vehicle or vehicle-to-object sound, and screeching of tires for example skids from locked brakes or lateral pushing of a vehicle. Rapid declaration, rapid changes in rotation, and crash sounds (glass breakage/metal folding/contact thud/screeching of tires) indicate a possible crash event. A crash indicator database 62 provides accident or crash event correlated motion and crash event sound thresholds. The information is processed 64 and compared with standards maintained in the database 62 to determine 65 whether a possible crash event has occurred. If not, the apparatus continues monitoring 66 for crash event signals. The use of multiple indicators of a crash event facilitates reduction of false alarms.

Monitoring crash event indications 54 involves detecting sounds with a mobile device microphone that exceed a respective predetermined threshold for one or more of the glass breakage/metal folding/contact thud/screeching of tires sounds, detecting changes in acceleration with 3-axis (x, y, z) accelerometers that exceed a predetermined threshold, and/or detecting changes in angular rotation that exceed a predetermined threshold. Upon detecting one or more high threshold events, the application 14 may check a GPS-based speed for evidence that the mobile communications device is slowing or rotating rapidly or has stopped moving. If the GPS-based speed is unchanged, the application 14 would reject 82 the detected event and return to crash monitoring 54. If the GPS-based speed indicated slowing/rotation/stopping, the processing of the sound and motion recording files, which would include recording for a predetermined period of pre-event sound and motion information and post-event recording of such information for a second predetermined period.

In an illustrative embodiment, the application 14 maintains a continuous recording database of the motion and audio signals received during monitoring. The database is configured for maintaining a lead portion (pre-event) of a predetermined period preceding the possible crash event and a trailing portion (post-event) of a second predetermined period post-possible crash event. The recorded database uploads to the central tracking/dispatch center 18 during notification communication of a possible crash event to the central tracking/dispatch center 18. The database 21 of the tracking/dispatch center 18 receives and stores the motion information and the sound signals on which the crash incident was determined, upon communication from the mobile communications device 16 of such information and signals through a communications network 30. Further, the database 21 maintains driver information of driver name, address, insurance company and policy number for a plurality of drivers and maintains vehicle crash information of motor vehicle, crash location data, date and time, and optionally one or more sequences of crash sounds from a crash location, one or more images thereof, for a plurality of crashed motor vehicles.

If the application determines 68 that a possible crash event has occurred, the application alerts 70 the driver. Determination of a possible crash event in the illustrative embodiment involves both sound and motion crash indicators being determined as true (i.e., exceeding respective predetermined thresholds). An exceeded sound threshold alone or an exceeded acceleration threshold alone or an exceed angular rotation alone may be rejected as indicating a crash event and processing would return to monitor 54. The combination may indicate a crash event. The alert 70 presents a visual message 104 (see FIG. 5) on a display of the mobile communications device 16. The alert 70 may include an unmistakable audio tone at high volume to draw the driver's attention to the mobile communications device 16. The driver may respond in the negative and the application 14 then returns to the monitor 54 processes. If the driver confirms the crash event, the application presents 72 selective choices for calling 911 or emergency contact, contact the insurance carrier, request roadside assistance, or cancel, as discussed below in reference to FIG. 6.

If the driver does not respond 72 after a predetermined period of time (for example, but not limitation, a period of 60 seconds), the application 14 initiates assistance. This includes notification to emergency centers (such as to local police authorities) 74, notification 76 to the central tracking/dispatch center 18, and initial accident notification 78 to the claims service center 26. The application may also evaluate 80 whether the accelerometer and sounds information should be uploaded to the crash indicator database.

The driver, upon being alerted to the possible crash event, may selectively respond for the system to ignore 82 the possible crash event (i.e., no crash event occurred); or 83 to initiate 84 telephone contact with appropriate local police authorities; to contact the insurance carrier 85 or to request 86 assistance. The application provides updates 88 to the driver as to the status of the requested assistance. Such updates for example, may include contact information for a tow truck operator and arrival time. The driver may select to cancel 89 the notifications and processing of crash event services by the application 14.

The application 14 accordingly synchronizes the crash event with the motorists, the date and time of crash event, the place of the crash event, and the severity of the crash event. This information provides a basis for accident reconstruction, predictive indications of potential loss and injury, and also perfects the validity of the report of the crash event by the motorist involved while supporting official investigative reports. The detected and recorded motion information (i.e., the acceleration signal and the angular rotation signal) provide additional information useful for accident reconstruction evaluations.

Figure 3:
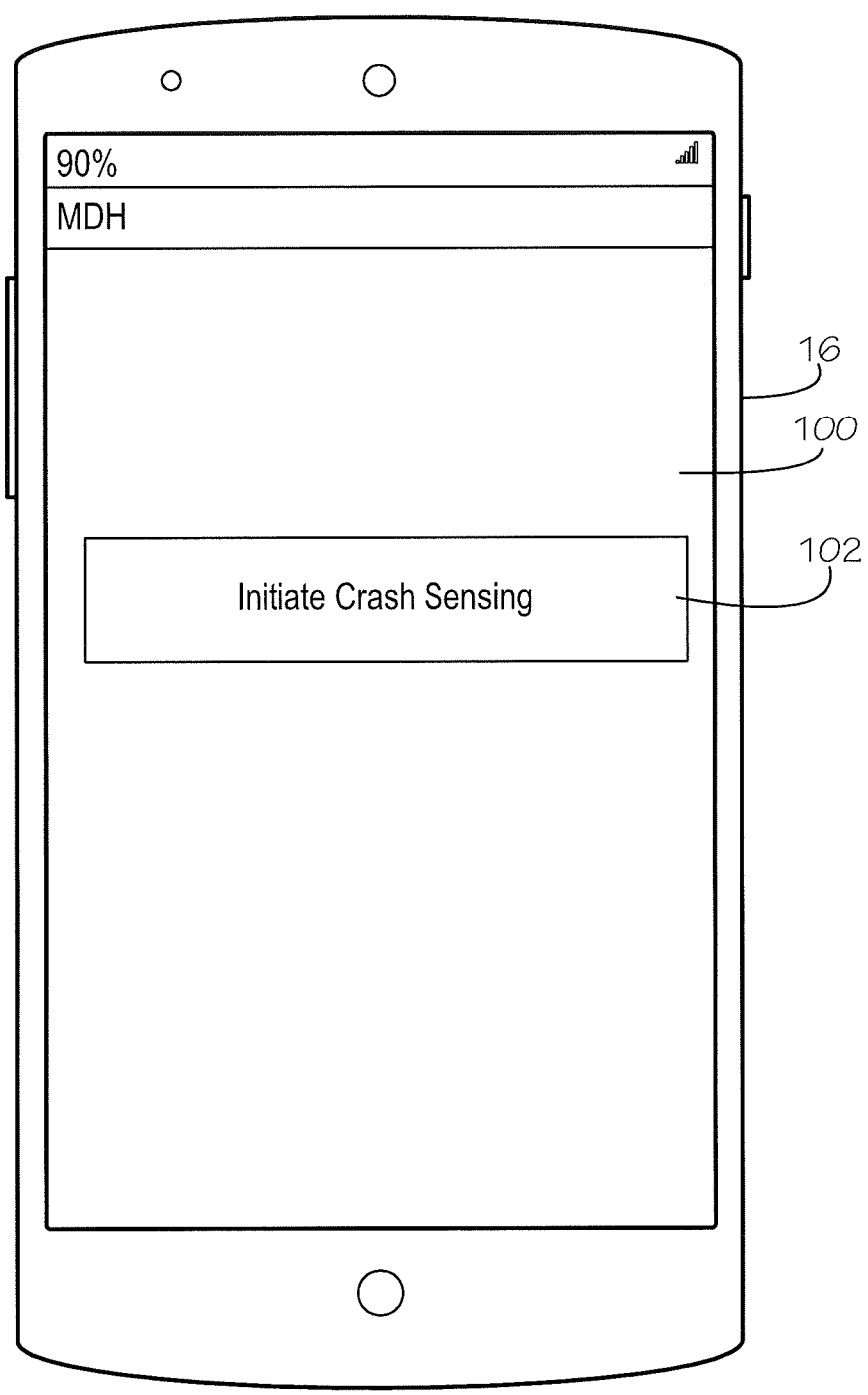
FIG. 3 illustrates a screen image for operating the crash detection, response and reporting application.

FIG. 3 illustrates a screen image 100 for operating the crash detection, response and reporting application 14 on the mobile communications device 16. The application 14 displays an activate button 102. Operating the button 102 causes the application 14 to operate in the background of the mobile communications device 16, monitoring for a possible crash event, and responding appropriately, as discussed above. It is to be appreciated that the initiate screen 100 (and the monitoring screen 110 (FIG. 4) are in an exemplary embodiment of a stand-alone application. A production application in an alternate embodiment such as provided to customers of an insurance provider, may embed the application 14 within a hosting application for the insured of the insurance provider or a similar hosting application with other consumer-facing features and services of the provider (for example, display a report of policy terms and limits, provide for changes to policy coverage, add, delete or modify driver and motor vehicle information, and other insurance servicing features.)

Figure 4:
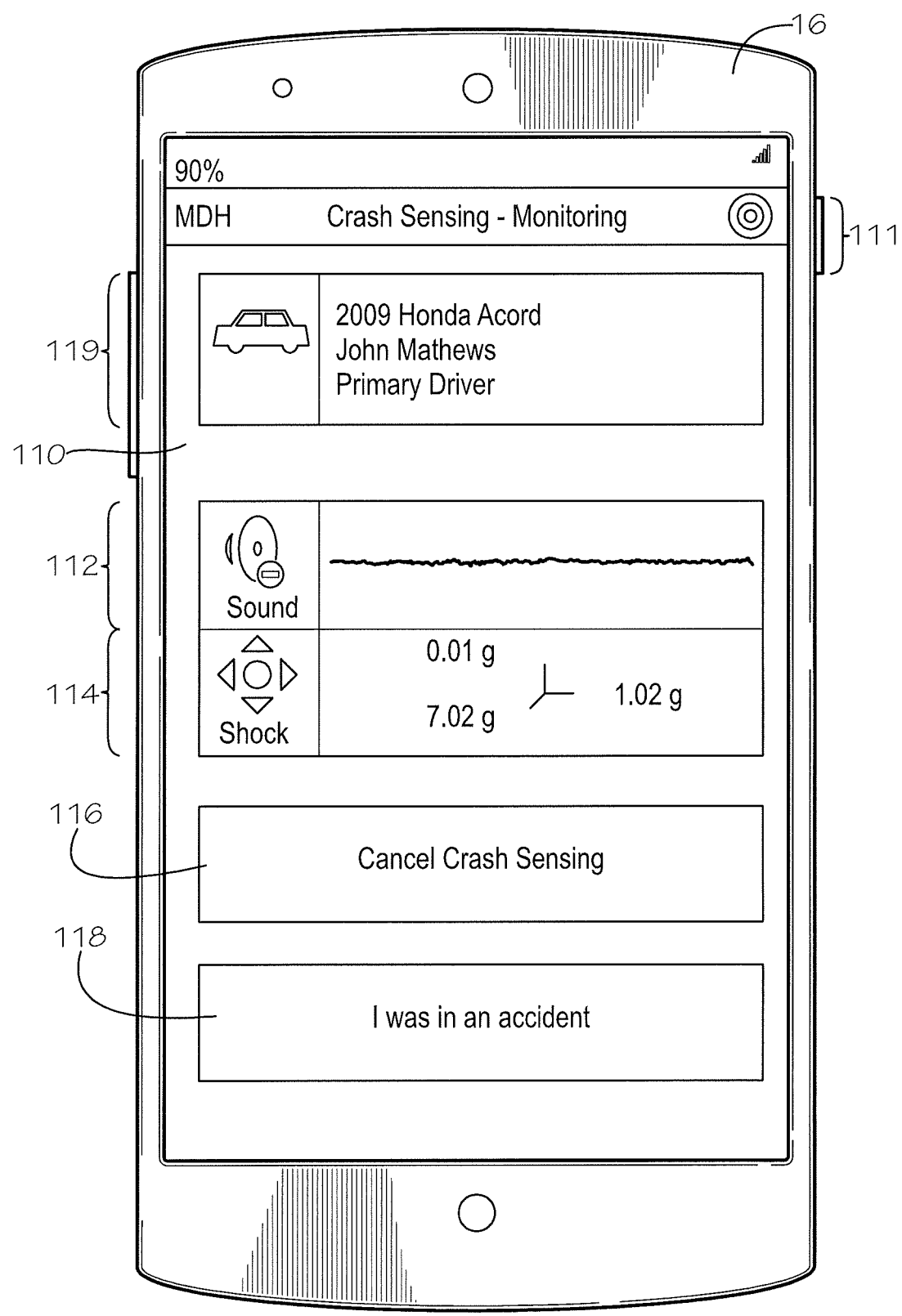
FIG. 4 illustrates a screen image during monitoring the operation of the crash detection, response and reporting application.

FIG. 4 illustrates the monitoring screen 110 that may be displayed during the monitor processing of the crash detection, response and reporting application 14. The screen 110 includes a status window 111. The status window displays a short descriptive phrase as to the status of the application 14 shown in Table 1 below:

TABLE 1

Status Window Phrases

| Phrase | Definition |
|---|---|
| Crash Sensing - Monitoring | the application 14 is monitoring for a possible crash event |
| Crash Detected - Triggered | the application 14 detects sound and motion information indicating a crash event may have occurred |
| Crash Sensing - Confirmed | a crash event has occurred; the application 14 provides action options for selection by the driver |
| Crash Sensing - Reported | the crash event has been reported and status of action options and of response servicers are displayed |

The window 111 in FIG. 4 indicates that the application 14 is monitoring for a possible crash event. The application 14 monitors sound events and may provide a real-time signal display 112 on the screen 110. Further, the screen 110 displays 114 the three-axis acceleration of the motor vehicle. A cancel button 116 causes the application to cease operating. An "in-accident" button 118 enables the driver to initiate crash event processing by the application 14, including notification to the central tracking/dispatch center 18 that a crash event has occurred. In response to the "in-accident"

button 118, the application 14 communicates crash information, vehicle information and driver information using the communications of the mobile communications device 16. A window 119 displays the driver and vehicle information. Alternatively, the display may present a graphic (not illustrated) of the motor vehicle based on the detected changes in the angular rotation of the mobile communications device 16.

Figure 5:
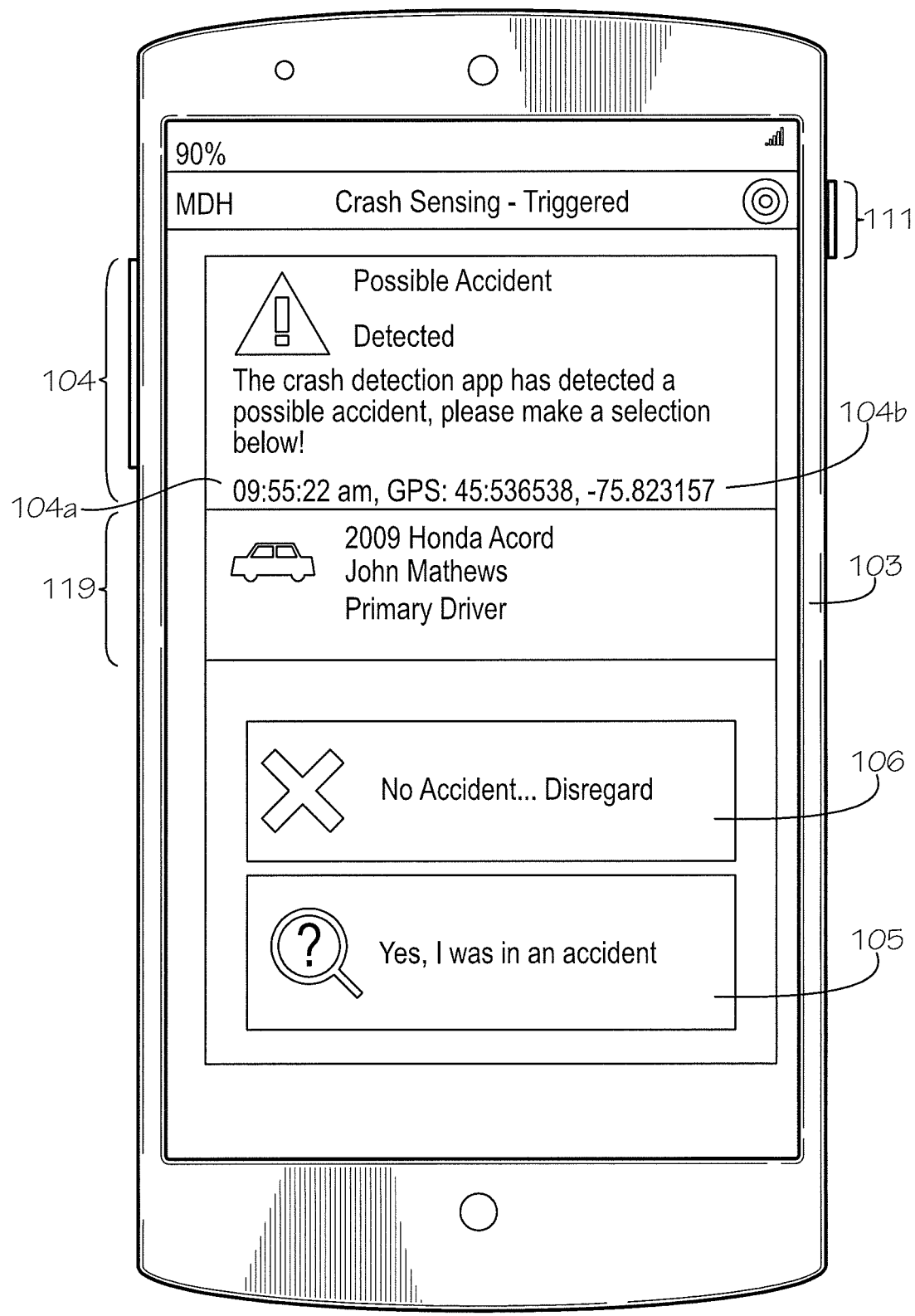
FIG. 5 illustrates a crash detected screen displayed when the crash detection, response and reporting application determines that a possible crash event may have occurred.

FIG. 5 illustrates a crash detected screen 103 displayed when the application 14 determines that a possible crash event may have occurred. The screen 103 may be accompanied with an unmistakable audio tone at high volume to draw the driver's attention to the mobile device. The screen 103 displays a possible event window 104 that includes the time 104a and GPS coordinates 104b as well as the vehicle information 119 window. The screen 103 includes a "no accident-disregard" button 106 and an accident confirmation button 105 with text "Yes, I was in an accident." The driver operates the "I was in an accident" button 105 to confirm the detection of a crash event. The driver operates the "no accident-disregard" button if the detection was incorrect as no crash incident had occurred.

The "I was in an accident" button 118 shown in FIG. 4 is for circumstances where the driver wants to proceed manually to report a crash event without the application detecting the crash event; FIG. 5 provides the confirmation "accident" button 105 for the driver to confirm that the detection of the crash event by the application was correct. Both buttons 118 and 105 cause the application 14 to proceed to crash event processing in reference to FIG. 6. The "no-accident-disregard" button 106 causes the application 14 to return to the monitoring screen 110 and monitoring as shown in FIG. 4.

Figure 6:
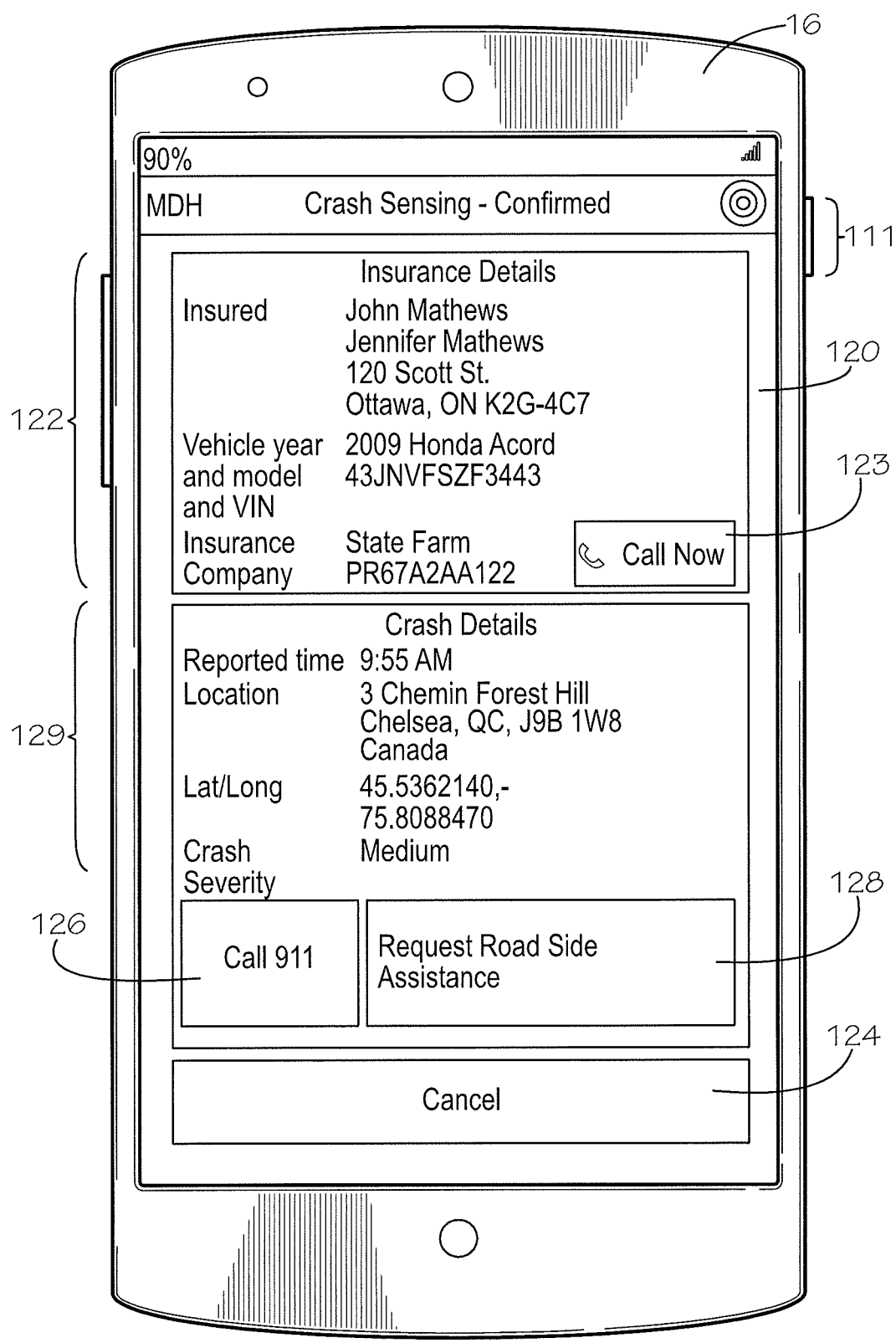
FIG. 6 illustrates a screen image following detection of a possible crash event by the crash detection, response and reporting application.

FIG. 6 illustrates a screen 120 displayed to the driver on the mobile communications device 16 following detection of a possible crash event by the crash detection, response and reporting application 14. The window 111 in FIG. 6 indicates that the application 14 acknowledges or confirms receiving the crash event notice following the use of the confirm button 118. The screen 120 includes an insurance window 122 that displays the name and address of the insured; the make, model and vehicle identification number of the insured motor vehicle; and the insurance carrier and policy number. The screen 120 provides selectively actuated buttons to direct the activities of the application 14. A "call" button 123 causes the application 14 to imitate a telephone call to the insurance carrier. A "cancel" button 124 directs the application to resume monitoring for a possible crash event. The application 14 notifies the central tracking/dispatch center 18. A "call 911" button 126 directs the application 14 to initiate a telephone call to local emergency services such as local police and ambulance services.

A "request assistance" button 128 initiates services from independent service providers 22. In the illustrated embodiment, the independent service provider 22 is a roadside assistance service. The application 14 communicates this request to the central tracking/dispatch center 18. The information communicated by the application 14 includes the vehicle identification number, the driver information and contact phone number, and the location, time, and event. A crash event window 129 displays crash event information including the report time, the location of the crash event (address, if determined), a geographical coordinate designation, and crash severity. The "cancel" button 124 cancels the reporting and status monitoring activities. Appropriate information for cancelation communicates from the mobile communication device 16, such as to the tracking/dispatch center 18 and/or the service provider 22.

Figure 7:
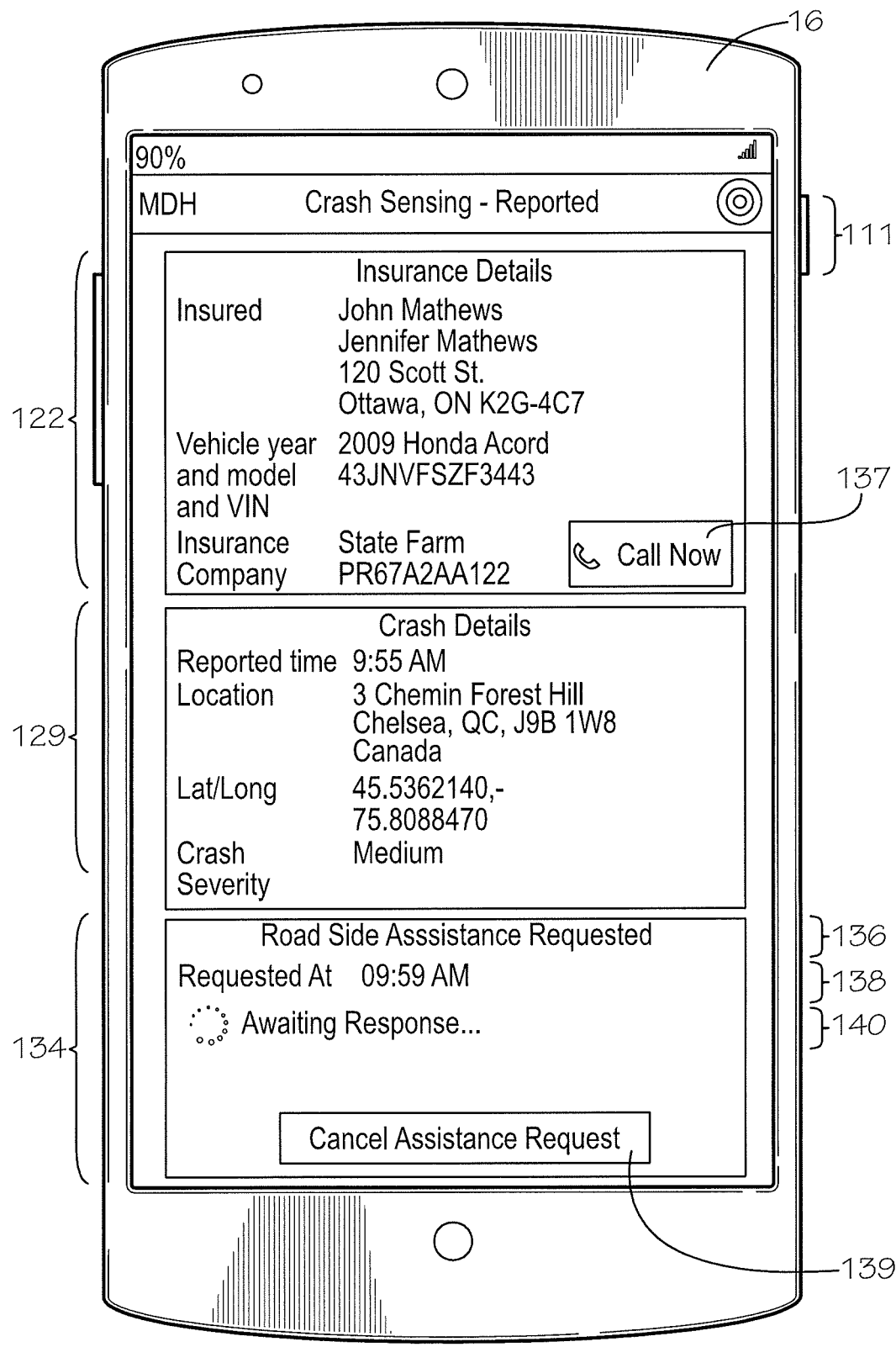
FIG. 7 illustrates a screen image of the crash detection, response and reporting application after a request for assistance.

FIG. 7 illustrates a screen 130 of the crash detection, response and reporting application 14 after a request for assistance is selected. The window 111 in FIG. 7 indicates that the application 14 has reported the crash event. The screen 130 displays the insurance window 122 and the crash information window 129. Optionally, the screen 130 may display the time of detection of the crash event and the time the crash event was reported to the central tracking/dispatch center 18. The screen 130 includes an update field 134. The application 14 presents in the update field 134 the status of the requested assistance. This includes the type 136 of assistance requested, the time 138 the request was made, and the status 140 of the response. The screen 130 may include an initiate emergency call button 137. A cancel assistance button 139 communicates a cancellation notice to the independent service provider 22 and to the tracking/dispatch center 18.

Figure 8:
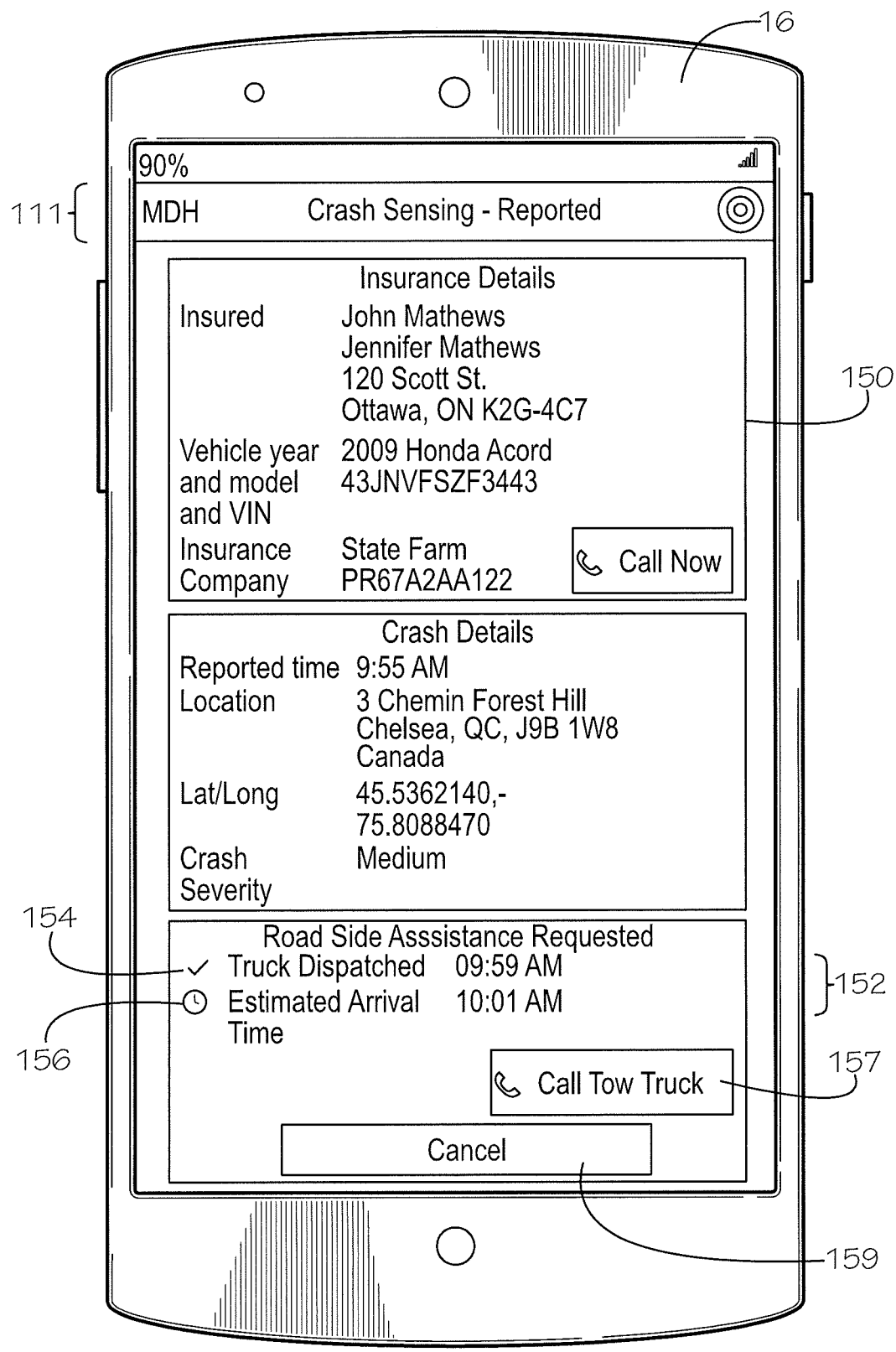
FIG. 8 illustrates a second screen image of the crash detection, response and reporting application after a request for assistance.

FIG. 8 illustrates a second screen 150 of the crash detection, response and reporting application after a request for assistance, depicting updated assistance information 152. This may include the time of dispatch 154 and an estimate time of arrival 156. The update field may also present (not illustrated) the contact information of the tow truck driver. A call button 157 initiates telephonic communication with the operator of the tow truck. Optionally, a confirm arrival button enables the driver to communicate status information to the tracking/dispatch center 18. A cancel button 159 communicates a cancellation notice to the independent service provider 22 and to the tracking/dispatch center 18.

Although not illustrated, the application 14 includes user setup screens for entry of driver and vehicle information. This information includes the driver name and address, insurance company and policy, and the vehicle identification number and make and model. The information uploads to the database 21 on the server 20. The native application, downloaded and installed on the mobile communications device 16, maintains background processes such as environmental monitoring that occurs. The environmental conditions for monitoring may be selected through appropriate control screens. For example, environmental monitoring may occur under conditions which correspond to the user driving or riding in a moving vehicle above a specified speed (e.g. 5 mph). Optional detection of known vehicle RF emitters (e.g. BT or WiFi) may be used to enhance recognition of in-vehicle operation. That is, detection of RF signals may cause the application 14 to commence monitoring. In an alternate embodiment, the application 14 operates from a selection button provided through a hosting application such as provided as an SAAS web site of an insurance carrier or fleet operator.

As discussed above, the environmental monitoring includes periodically receiving and evaluating x, y, z accelerometer outputs and/or gyroscope axis output (such as accelerometer or gyroscope devices embodied in the mobile communications device 16) and microphone (e.g. engine sounds, ambient sounds, crash sounds) for communication of sounds for analysis of possible crash events. In addition, the application may receive motor vehicle speed signals (either GPS or handset-based cellular assisted) and configured for translating to approximate vehicle x, y, z coordinates and thus speed and angular rotation.

A determination of a significant possible crash event may be made upon detection of multiple ambient conditions, such as: high negative acceleration in the motor vehicle x or y axis, rapid negative change in vehicle speed, high or rapid changes in angular rotation, and crash sounds corresponding to vehicle impacts. An alternate embodiment includes spectral analysis for sounds of glass breaking and metal shearing, bending, folding, or otherwise experiencing high impact change, impact thud, and tire screeching in the possible crash event determination. The determination is made based on a reasonable match of sounds from the event with sounds from known crash events. Such information may be maintained in a crash indicators database.

Upon determination 65 of a significant possible crash event, actions may be initiated (automatically or selectively) which may include:

a. Prompting 70 the mobile communications device 16 via screen message 104 and notification sound requesting driver confirmation 105, 106 whether a crash event has occurred and whether the driver wants to place an emergency 911 call.

b. If the user confirms a crash, the application may immediately send 83 a message to third-party for roadside assistance initiation and to the tracking/dispatch center 18.

c. If the user does not respond to the application notification (e.g. because the driver is injured or otherwise unable to respond), the application may prompt the driver with an audible message to confirm verbally to call 911 via voice command. Optionally, the application may be configured to include the user/driver opting into an automatic crash notification feature which activates a speakerphone-based 911 call to permit a 911 operator to interrogate the driver hands-free.

Upon initiation of the roadside assistance call, the application 14 may be used to communicate the status of roadside assistance response. This feature may be subject to the level of integration with the roadside assistance company or other service provider.

The application of the present invention provides improved reporting of motor vehicle accident and crash information to persons having interest in the driver status (such as, parents, central tracking/dispatch, fleet operators, and others), while providing early initiation and first notice to the insurance claim service of the crash event, and providing dispatch of independent service provider services 22 such as tow truck services, though a machine-to-machine monitor, tracking, and notification system. The first notice available through the monitor, tracking, and notification system facilities claims processing by providing the identification of the insured motorist, the motor vehicle involved, the location of the vehicle and the crash event, and updates of the status. Further, the application in an alternate embodiment includes video/photo recording features following detection/confirmation of a crash event. This enables the driver to generate video/photo image files that may automatically upload to the tracking/dispatch center 18 and servers 20 to complement or substitute for tow truck-generated video/photo information.

In an alternate embodiment, the mobile communications device 16 may be configured for determining whether the device is in the hands of the driver or passenger. This may be determined in various way, including monitoring the accelerometer 17*a* and/or the gyroscope 18*b* as the rotation sensor, the use of the touchscreen of the device, use or activity of another software application operative with the mobile communications device, and monitoring for excessive speed or braking as indicative of driving issues. For example, the application may access commercial routing software to determine the legal speed limit on road and compare such with the actual speed of the motor vehicle in which the mobile communications device is carried. Alternatively, the monitoring configuration may use other of the device's sensors, such as the camera, to determine where the device is relative to the driver's seat or steering wheel of the vehicle. Yet alternatively, the application 14 may be configured to use the inertial sensor data to determine handheld use of the mobile communications device 16 while driving, for initiating warnings or alerts to the driver. Alternatively, the configuration may incorporate a comparison of RF patterns from the vehicle operation associated previously with the driver to determine differential operation. If the application 14 determines the mobile communications device 16 is within the hands of the driver, or is being operated by the driver, an alert may be provided as to inappropriate or prohibited driver behavior (e.g. texting, excessive speed and braking, erratic driving, etc.). Further, a fleet operator may be notified, for example, after repeated alerts to the driver, which alerts may include entries to a driver's operation history maintained by the fleet operator or escalated actions up to an including warnings and notifications that driving privileges are being revoked. In such matters, a driver may need to complete an in-house fleet operator curriculum or tutorial on motor vehicle safety operations in order to restore driving privileges on behalf of the fleet operator. If the driver is entering data (e.g. text message, updating apps, etc.), an audio and visual warning to the driver could be made to discontinue while driving.

With reference to the drawings and FIGS. 1 and 2, the system 10 detects the crash of the motor vehicle with crash detection device carried with the motor vehicle for crash response and reporting. The driver (or passenger) carries or brings into the motor vehicle the mobile communications device 16 configured with the sensor that generates the motion signal responsive to motion of the mobile communications device and a sound receiver for receiving a sound signal of sound proximate the mobile communications device. The motion signal may be the acceleration signal from the accelerometer 17*a*, the angular rotation signal from the gyroscope 17*b*, or both. The mobile communications device 16 configured with software instructions or application 14 that upon execution monitors for an occurrence of a crash event by periodically interrogating (a) the motion signal to determine whether a change in motion exceeds a predetermined motion threshold and (b) the sound signal to determine whether a sequence of sensed sound signals within a predetermined period matches one or more crash sound indicators of (i) glass breakage, (ii) metal folding, (iii) contact impact, and (iv) tires screeching. A display that upon determining the occurrence of the crash incident displays a possible event window with a selectable option of the driver or passenger (a) to return the mobile communications device to monitoring for the occurrence of the crash incident or (b) to confirm the crash incident. Upon a failure of selection of one of the selectable options within a predetermined period, communicating by the communications network 30 an identifier associated with the mobile communications device 16 and crash incident information including the location data to a tracking and dispatch center 18 having a pre-registered record of the mobile communications device 16 and configured for receiving and storing the acceleration information and the sound signals on which the crash incident was determined. The servicer 22 dispatched by the tracking and dispatch center 18 responds to the site of the crash incident based on the location data.

The claims service center 26 is configured for servicing an insurance claim arising from the crash incident as reported by the tracking and dispatch center 18. Additional incident services may be provided, such as providing through the servicer 22 a transport vehicle for transporting a damaged motor vehicle to the crash site and also providing insurance claims process services for the motor vehicle owner, operator and insurer including documentation, images, and accident incident details about the operation of the motor vehicle.

Figure 9:
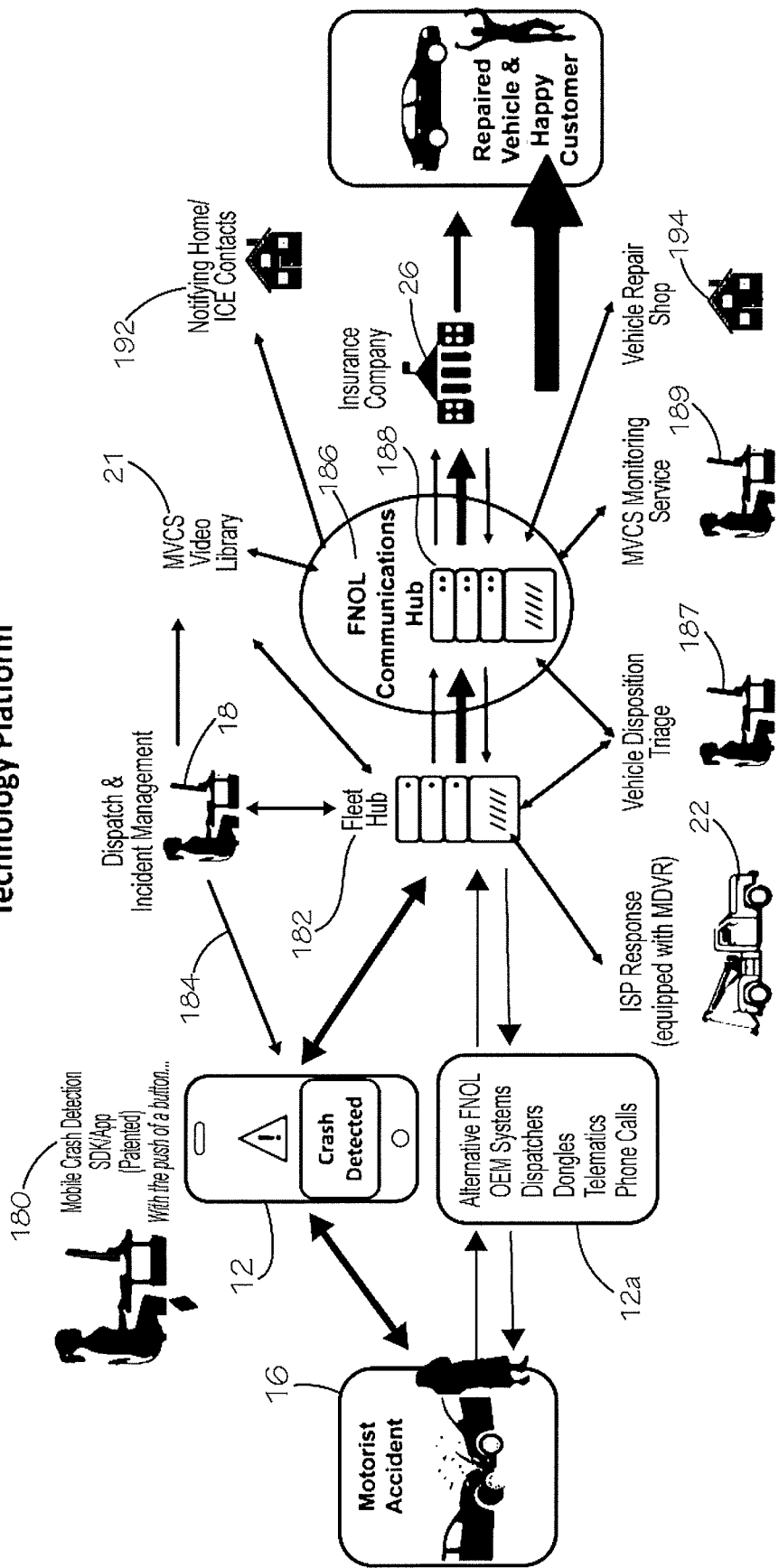
FIG. 9 illustrates a schematic diagram of an integrated system and method for data collection and communications management via a communications hub for motor vehicle crash event claims resolution with first notice of loss upon detecting the occurrence of a motor vehicle crash and responding and reporting the detection of the motor vehicle crash.

FIG. 9 illustrates in a schematic diagram an embodiment 180 of the present invention providing an insurance claims process services system as an integrated system and method for claims resolution data collection and communications management within a fleet vehicle system having a fleet hub 182 for first notice of loss upon the detecting of the occurrence of a crash involving motor vehicle(s) 12 and the dispatch tracking center 18 for responding and reporting generally 184 of the motor vehicle crash. The illustrated embodiment includes a communications hub 186 for motor vehicle crash event claims resolution. The fleet hub 182 operates or monitors one or more motor vehicle usages as a fleet of a plurality of motor vehicles. The fleet hub 182 maintains a database 188 of motor vehicle information for each vehicle in the fleet, including equipment type, current travel schedule (from and to locations, date, current location (GPS)), driver/operator information associated with the motor vehicle (name, contact information, and identification number associated with the mobile communications device equipped with the crash event detection and reporting application disclosed herein). The communications hub 186 includes a database 188 that provides a central repository of data, facts, reports, information, videos, images, sounds, vehicle disposition, insurance coverage and claims resolution relating to the crash event. The centralized repository includes the driver/operator information (name, contact information, identification number associated with the mobile communications device equipped with the crash event detection and reporting application disclosed herein, and insurance carrier 26 information including coverage policy and carrier contact such as phone number and/or email address for notifications and for claims servicing) and contact information for registered related persons if any associated with the driver for example spouse and other relatives and fleet operator if any. The communications hub 186 is configured for providing communications 192 to registered contacts of the driver and the insurance carrier 26 as to the crash event. The registered contacts have one or more contact identifiers such as office phone number, cellular phone number, email address or other identifier through which the registered person may be contacted for communications. The communications hub 186 also communicates as to vehicle disposition status, for example, as illustrated with vehicle repair shop 194 but salvage disposition as well, and with the tow service provider 22.

In continuing reference to FIG. 9, the communications hub 186 in an alternate embodiment may be configured for vehicle disposition triage evaluation. The communications hub 186 may be configured for providing near real time videos, pictures, text (reports), and/or audio information from the crash event site a vehicle disposition triage site 187. The vehicle disposition triage site 187 applies the information within an analysis protocol to assess and evaluate appropriate disposition of the damaged vehicle and documenting information pertinent to the extent of damage for a resultant property damage claim. Further, the communications hub 186 supports a services monitoring center 189. The center 189 particularly monitors within the illustrated embodiment the tow service provider for example in the preparation of crash event and response incident and response performance reports summarizing relevant crash information and services provided. These include incident reports for example, determining and limiting a liability issue involving the tow service provider 22 in relation to tow truck operation and services. Similar support may be provided for other responder services. The communications hub 186 further periodically performs quality checks to ensure proper operation on the video and related equipment on the tow trucks and the collected information may be used for incident reports pertaining to driver performance.

Figure 10:
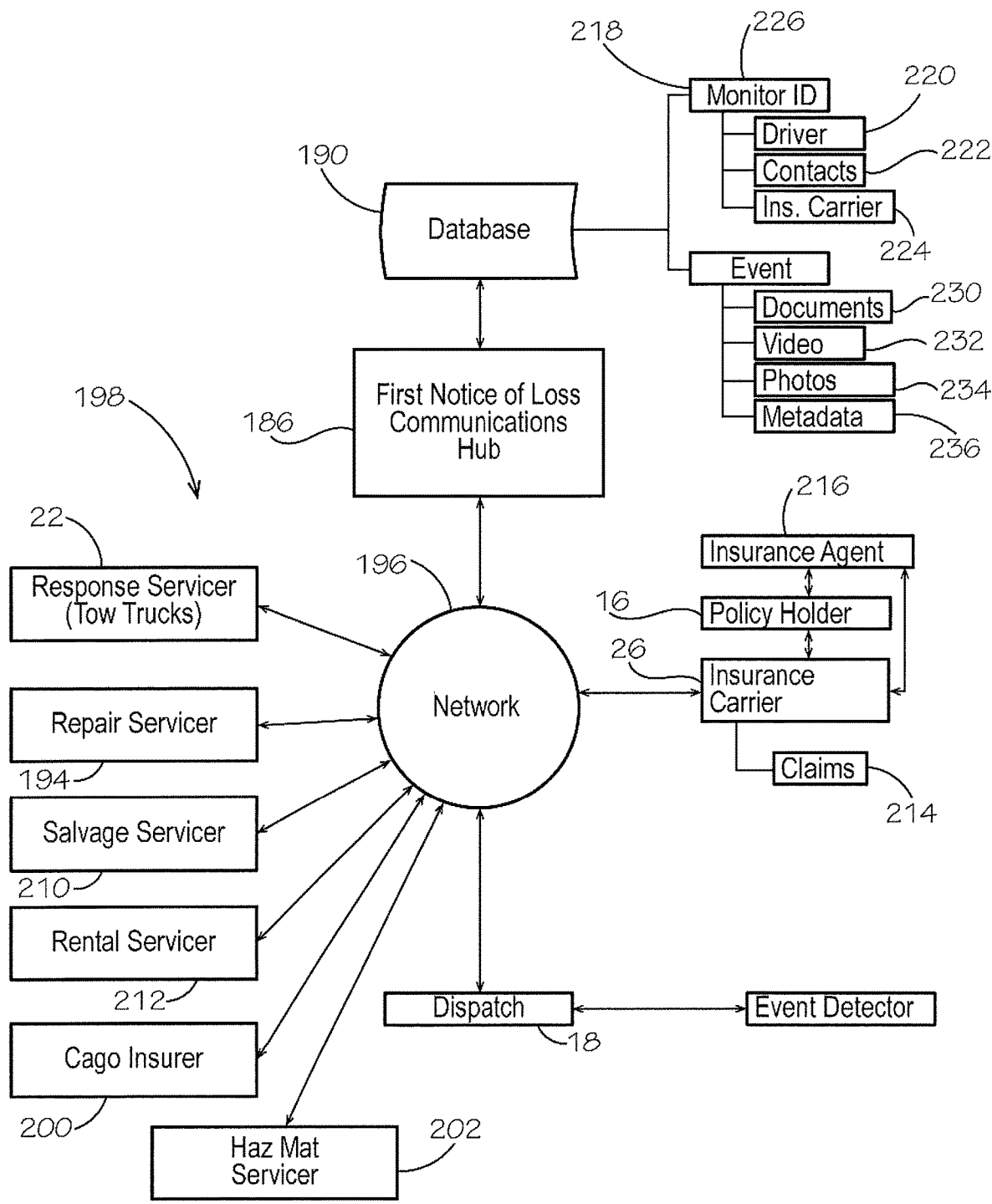
FIG. 10 illustrates a detailed schematic diagram of communications hub of the integrated system and method for data collection and communications management for motor vehicle crash event claims resolution illustrated in FIGS. 1 and 9 with first notice of loss upon detecting the occurrence of a motor vehicle crash and responding and reporting the detection of the motor vehicle crash.

FIG. 10 illustrates a detailed schematic diagram of the communications hub 186 of the integrated system 180 for data collection for the central repository database 190 and communications management for motor vehicle crash event claims resolution illustrated in FIGS. 1 and 9 with first notice of loss upon detecting the occurrence of a motor vehicle crash and responding and reporting the detection of the motor vehicle crash. Particularly, the communications hub 186 provides insurance claims process services generally 94 for the motor vehicle owner, fleet operator (such as in the illustrated embodiment) and insurer including accident documentation, accident and vehicle images, accident incident details about the operation of the motor vehicle, motor vehicle disposition (repair service 192 or salvage). The communications hub 186 thereby provides a central repository for the parties involved in claims resolution.

In that regard, the communications hub 186 communicates through a telecommunications network 196 with authorized servicers generally 198 involved in responding to the crash event and supporting claims resolution subsequent to the crash event. The servicers access the communications hub 186 through a portal such as an Internet web site. The portal provides conventional login security such as user name, password, second factor authentication, and encryption of communications. The communications hub 186 maintains login information for authorized servicers 198, receives and stores accident event and subsequent claims process documentation, and coordinates instructions and responses among the servicers. The servicers include the response servicer 22 for initial response and documentation generation at the crash site, the disposition servicers that include the repair servicer 194 and a salvage servicer 210, a rental servicer 212 for providing temporary use of a motor vehicle for the policy holder 16. The insurance carrier 26 includes a claims servicer 214 and may include an insurance agent 216 for interacting between the policy holder and the insurance carrier for insurance sales and service. Cargo damage and risk may further involve communications with cargo insurer services 200 and site cleanup and remediation may involve third party hazardous materials servicers 202. These may be local fire department and rescue services or private commercial entities.

The communications hub 186 maintains the database 190 of driver information records 218 and of accident event information 220. The driver information records 218 includes the driver name 220, contacts information 222, insurance carrier information 224 and the identification number 226 associated with the mobile communications device equipped with the crash event detection and reporting application for the driver. The database 190 also collects and distributes to authorized servicers 198 documentation 230 of the crash event, including written documents such as email correspondence, letters, reports (for example but not limited to police, accident investigator, analysts' reports, claims service reports, vehicle disposition, vehicle repair estimates, authorizations, and completions, salvage and disposition, and resolution documents including offers and settlement agreements). The database further receives and stores video files 232, photographs or digital images 234 related to the crash event or persons involved, and metadata 236 related to the crash event. The metadata particularly includes the data regarding the interrogated changes in motion of the mobile communications device (acceleration and/or angular rotation). This data includes (a) the motion signal on which a determination is made that a change exceeds a predetermined motion threshold and or (b) the sound signal on which a determination is made that a sequence of sensed sound signals within a predetermined period matches one or more crash sound indicators of (i) glass breakage, (ii) metal folding, (iii) contact impact, and (iv) tires screeching. In an alternate embodiment, the metadata may include motion signals for a first predetermined period preceding the determination as well as motion signals for a second predetermined subsequent to the determination.

Figure 11:
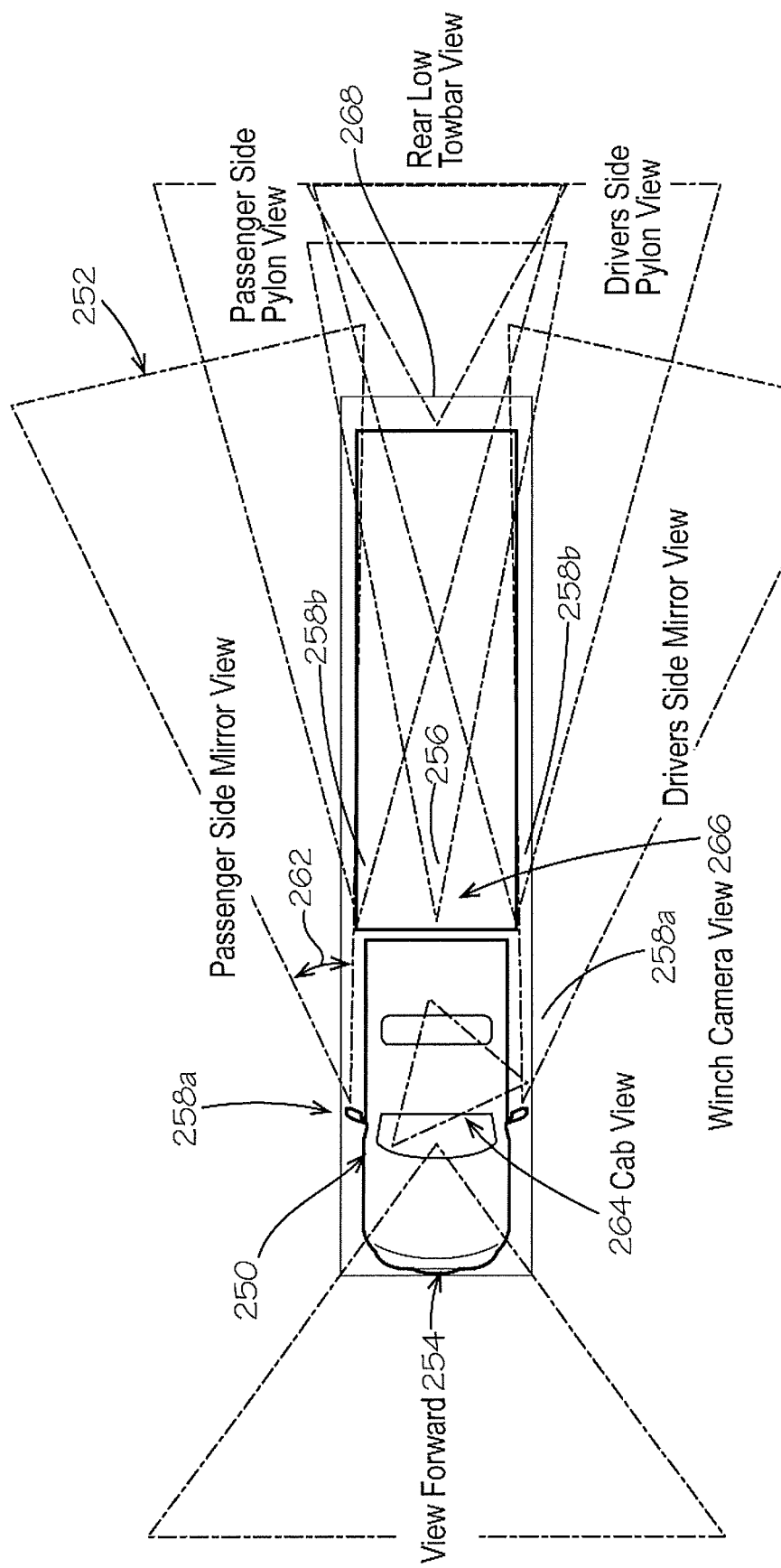
FIG. 11 illustrates a tow vehicle provided by crash event responder equipped with a plurality of imaging devices for memorializing crash event actions.

FIG. 11 illustrates the tow vehicle 250 provided by a crash event responder, which tow vehicle is equipped with a plurality of imaging devices 252 for memorializing crash event actions. The imaging devices 252 mount to the tow vehicle for imaging forwardly 254, rearwardly 256, and opposing sides 258, 260. The opposing side imaging devices preferably mount at an oblique angle 262 outwardly relative to a longitudinal side of the tow vehicle for imaging of passing vehicles lateral of the tow vehicle. The opposing side imaging devices may be mounted for mirror view images 258(a) and/or alternatively pylon view (258b) proximate the side of the tow vehicle. Analysis of the side images may yield identification of vehicles having operators in violation of traffic laws requiring reduced speed or "move over" spacing from the stopped tow vehicle present at the crash site. The analysis may be made by viewing of the recorded drive-by images or with a computer assist or analyzer for extracting vehicle information (color, type, characteristics, license tag and other such information). Alternatively, the tow vehicle 250 may selectively include an in-cab imaging device 264 and a winch imaging device 266. In an alternate embodiment, a tail end image device 268 mounts to a support member disposed below a leading edge of the flatbed platform of the tow truck. The image device 268 faces rearwardly to image the extraction of the crashed motor vehicle and particularly the undercarriage for documenting undercarriage damage post-crash event and prior to/during extraction.

The communications hub 186 of the present invention provides a centralized claims service center that receives a first notification of loss notice from the tracking and dispatch center 22, such as may be operated by a fleet hub 182, and thereafter receives, stores, and makes available information related to the crash event subject of the notice. The notice communicates from a crash event detector, such as the disclosed application operative with the mobile communications device. The notification includes the identifier and information of the possible crash event. The communication hub 186 thereafter receives multimedia inputs from one or more notice of loss information providers and servicers. The providers and servicers include the insured, the insurance company, the insurance agent, repair shups, salvage or storage yards, and other interested entities. The communications hub 186 further may be configured in an alternate embodiment for servicing of one or more insurance claim(s) for personal and property damage arising from the crash event.

The communications hub 186 acts as a "cradle-to-grave repository" or beginning-to-end collector from commencement of collecting crash information upon notice, processing and maintaining crash event information about the crash and resulting insurance claims (personal and property), to final resolution of the claims arising from the crash event. The communications hub 186 may be independent providing services to fleet operators as well as for insurance carriers, or motor vehicle industry operator involved in servicing motor vehicle crashes and/or insurance claims resulting from said crashes. The communications hub 186 provides a central facility with visibility into all activities involved with a crash and claims resolution. This includes initial crash response beginning with accident severity, pre-claim data and videos from the accident site, consumer phone and written correspondence, vehicle location at all times, data from the adjustment process, vehicle repair and/or salvage information and other related data.

With reference to FIGS. 1 and 2, the system 10 in accordance with the present invention operates 52 for detecting a crash incident of the motor vehicle with crash detection response and reporting. The system 10 provides (a) the plurality of mobile communications devices 12 each carried by a driver or passenger in the motor vehicle. Each mobile communications device 12 has the motion sensor (accelerometer 52 as an acceleration sensor and/or gyroscope as an angular rotation sensor) that generates the motion signal responsive to motion of the mobile communications device 12 and the sound receiver for receiving a sound signal of sound proximate the mobile communications device. The mobile communications device 12 is configured with software instructions that upon execution monitors 54 (preferably in the background of the operation thereof) for the occurrence of a crash event. The software instructions are configured 64 for (b) periodically interrogating (a) the motion signal to determine whether the change in motion exceeds a predetermined threshold, (that is, of the accelerometer 56 to determine whether a change in acceleration exceeds a predetermined acceleration threshold and/or the gyroscope to determine whether a change in angular rotation exceeds a predetermined rotation threshold), and (b) the sound signal to determine whether a sequence of sensed sound signals within a predetermined period matches crash sound indicators of (i) glass breakage, (ii) metal folding, (iii) contact impact, and (iv) tires screeching. Then, (c) based on the interrogations of the motion signal(s) and the crash sound signal, the mobile communications device 12 determine 65 whether a crash incident occurred, and if so 68 the display of the mobile communications device 12 alerts the driver 70 and displays a possible event window 104 (see FIG. 5) for selection by the driver of one of (a) return 106 the mobile communications device to monitoring 54 for the occurrence of a crash event and (b) to confirm 105 the crash event. In one aspect the mobile communications device (d) makes an alert, which may be audible or visual. In response, (e) determining 71 whether the alert generated a crash response by the driver through the mobile communications device, and if not, 72 communicating a location data of the crash incident to a service provider for response. For example, upon a failure of selection of one of the selectable options within a predetermined period, the mobile communications device 12 communicating by a communications network 30 an identifier associated with the mobile communications device and crash incident information of the location data, date and time to the tracking and dispatch center 18 for entry into the database 21. Further, the system 10 includes at least one response servicer 22 for dispatching by the tracking and dispatch center to the site of the crash incident based on the location data, the response servicer 22 providing the lantern device 24 having the light 25, the imaging device 27, and a communications device 29, whereby images received by the imaging device 27 communicate by the communications device 29 through the network 30 to the tracking and dispatch center 18. The images may be video or single frame. Further, (f) the tracking and dispatch center 18 communicating a status of the service provider 22 response to the mobile communications device 12. Alternatively, the response servicer 22 may provide the vehicle transporter (tow truck 23) for vehicle pull-out or movement at the crash site and for transport to a repair center or storage facility. The tow truck may include an electronic data storage device for communication with the imaging device and recording of images prior to communicating the recorded images to the tracking and dispatch center 18.

An alternate embodiment includes alternative reporting and action path for commercial vehicle operators that addresses the difference in procedures for motor vehicles and trucks used in cartage. For example, the third-party servicer may include cargo insurance carriers, emergency response teams for tracking and fleet operators, hazardous materials handling and clean-up services, salvage and similar such services. Such embodiment provides for simultaneous reporting and alternate claim information streams.

With reference to FIGS. 9 and 10 in the illustrative embodiment, the mobile communications device 12 communicates as a crash event detector device the interrogated changes in motion of the mobile communications device (acceleration and/or angular rotation) with the notice of the possible crash event to the tracking and dispatch center 18. The motion signal data, and in an alternate embodiment the motion data for the first predetermined period preceding the determination and alternatively the motion date for the second predetermined period subsequent to the determination is received and stored as crash event metadata 236.

The first notice of loss may in alternate embodiments communicate from a crash event notifier 12*a* to the communications hub 186 for originating a file for the crash event within the central repository database 188. The notice may originate from one or more notifier 12*a* as related entities including the insurance carrier, the driver involved, a motor club organization, a tow provider, a crash event SDK imbedded in a consumer software application operated by the driver or owner of the motor vehicle through an insurance carrier, a motor club servicer, a cell phone network provider, a motor vehicle OEM monitoring servicer, as well as originating after a telecommunications report (telephonic, email, facsimile, mail, or other communications mode), a towing dispatch servicer, and a towing service provider (private or municipal). Thus, the alternative first notice of loss notifiers may initiate the central communications hub 186 actions and repository information collection, storage, and reporting, through OEM motor vehicle services such as ONSTAR tracking service or similar, motor club dispatch and reporting services (for example, AAA motor club of which the motor vehicle operator is a member), third party crash detection device (using a dongle configured for crash event detection operatively engaged to the motor vehicle data bus), other third party telematic systems, or motorist communications (telephone, mail, email, SMS text) to a related associated entity (employer, insurer, motor club service).

In the illustrated embodiment, the communications hub 186 communicates with the response servicer 22 as to disposition of the motor vehicle, which servicer reports transport of the motor vehicle to a storage lot, or to a repair servicer 194. The movement and disposition may be made by a non-solution entity or a solution entity. Non-solution entities include the motorist, law enforcement personnel responding to the crash event, out of network tow service provider, or other entity not affiliated with the communications hub 186. A solution entity is one of the various entities associated with the communications hub 186. These include but not limited to tow service providers such as one trained and authorized to make vehicle disposition assessments at the crash site. The disposition of the motor vehicle communicates to the communications hub 186 for tracking disposition location and status within the database 190. Alternatively, disposition may be determined by an appropriate authorized vehicle triage evaluator such as personnel of the insurance carrier, the motor vehicle owner, or other authorized third-party servicer.

If an adjuster finds the motor vehicle unrepairable, the disposition of the motor vehicle to a salvage yard 210 may be expedited by communications through the communications hub 186. Such communications memorialize documents 230 providing owner consent for transport and delivery of the motor vehicle to the storage lot, the repair servicer 194, or salvage 210, and related documents including adjuster reports of damage and repair costs, and insurance carrier agreement for repair or salvage. Similarly, temporary motor vehicle may be provided by the rental servicer 212 (whether owner paid or covered by insurance). The rental documents similarly are communicated to the database 190 of the communications hub 186 for storage and access as necessary by the motor vehicle owner and the insurance carrier 26.

The crash detection, response and reporting apparatus 10 according to the present invention establishes, occupies, and provides an effective interlinked network of a plurality of motor vehicles 12 each tracked locally during motor vehicle operation by a microprocessor-based application 14 that executes software code on the mobile communications device 16 of the driver, featuring communications networked driver/motor vehicle, central tracking/dispatch monitoring center 18, and attendant services including claims servicer 26 for an insurance carrier and support features for drivers such as tow truck services 22, for an end-to-end motor vehicle status tracking and reporting system featuring improved first notice of loss and machine-to-machine communicating between the motor vehicle, the monitoring center, and the services offering independent service providers (tow truck operators or claims servicers, for illustrative non-limiting examples), and enhanced revenue for insurance providers tracking motor vehicle status, incidents, and incident or accident reconstruction, documentation, and adjustment. The improved first notice of loss provided by the operation of the automated crash detection application 14 benefits insurance carriers, fleet operators, and individual motor vehicle operators by identifying the insured motorist or driver and the location of the incident involving the driver and the motor vehicle while providing coverage details to improve claims processing efficiencies and advance the handling and resolution of claims though automatic or manual reporting of incident occurrences and communication to service providers of assistance needs. The system tracks and monitors vehicle care and logistics, while further assisting with evaluation of accident causes and reconstruction for resolution purposes.

The application 14 operates 52 in a background mode automatically or upon initiation by a driver and resolves locating insurance information from a wallet or storage within the motor vehicle. Independent service providers 22 such as tow truck operators benefit with automated identification of insured drivers, motor vehicle or incident location, and automatic or manual initiation of service support and response. Images of service response at the incident location are readily uploaded using the lantern 24 and the video and telecommunications equipment 19 of the service provider 22 to the monitoring center 18 to provide documentation for service fees while potentially reducing claims against service providers. In the illustrated embodiment, the lantern 24 may comprise imaging devices configured particularly for imaging (video and still), storing the images with metadata (for example, location GPS information, date and time), and communicating the images directly or indirectly at a later time to the communications hub 186. Such devices may include a smart phone, a body camera, specially configured camera imaging device, as well as one or more imaging devices mounted to a responding tow vehicle.

Insurance claims servicers 26 obtain automated and seamless communications of identified motorist claimants and improved timely first notice of loss and further benefit with increased efficiency of services dispatch processing and handling of claims resolutions including as appropriate access and uploading of live video and audio from incidents. Fleet (as well as individual) motor vehicles operated by drivers registered with the central tracking/dispatch monitoring center 18 are readily monitored, assisted and reported on appropriately.

The central communications hub 186 receives notice of the crash event and provides early notice of loss to the insurance carrier 26 even prior to notice and/or claim by the insured. The system thereby filters accidents to provide assistance from the response servicer in the crash event incidents that have significant possible damages (accidents requiring tow service are more likely to involve a subsequent claim to the carrier for damages). While the number of such incidents is less than the "parking lot" or low impact incidents, the damage claims for such incidents are significantly more. The insurance carrier can thus direct coordinated attention to reducing the administrative costs of claims resolution while collecting accident details, documents, and video and images, for possible use in litigation and in settlement as well as analysis for roadway and motor vehicle defects. Prompt resolution not only reduces costs to the insurance carrier but leads to increased policyholder satisfaction. The communications hub 186 thereby provides motor vehicle accident communications from first notice of loss to final resolution of claims and damages. The communications hub 186 within the crash detection and reporting system 180 supports management of claims and claims analysis, customer policyholder experiences, data and documents collection and storage, as well as providing readily ascertainable status of the motor vehicle (storage, repair, salvage), and tracking of payments for repairs, parts, towing and storage fees, and claims for personal and property damage. The central repository database 190 makes claims and vehicle status and documents readily available to the range of servicers while facilitating workflow and task assignment communications, such as through application program interface (API) interfaces tailored to provide access to the particular information needed by a respective service provider.

More particularly described, the present invention provides a comprehensive crash event and claims servicing system with a centralized communications hub for receiving, storing and distributing crash event information for parties involved with the crash event. The comprehensive crash event and claims servicing system comprises a telecommunications network and a communications hub having a transceiver for receiving and communicating through the network crash event information from at least one crash event servicer and maintaining said information in an electronic database operatively engaged with the communications hub. The crash event notifier communicates notice of a possible crash event to the communications hub to initiate a crash event file for maintaining crash event information associated with a crash event. The crash event file is associated with an identifier associated with a notice of possible crash event for information collection, storage, and distribution. The crash event notifier, or source providing notice of a crash event includes a crash event detector device such as the mobile communications device carried by the driver of the vehicle involved in the possible crash event, a crash event SDK imbedded in a consumer software application operated by an insurance carrier, a motor club servicer, a cell phone network provider, a motor vehicle OEM monitoring servicer, a telecommunications report, a towing dispatch servicer, and a towing service provider (private or municipal). In the illustrated embodiment, the crash event notifier comprises a mobile communications device configured with software instructions that upon execution monitors for the occurrence of the possible crash event by periodically interrogating (a) a motion signal of a sensor responsive to motion and (b) a sound signal of a sound sensor responsive to sound signals within a predetermined period matching the crash sound indicators. The crash sound indicators comprise one or more of (i) motor vehicle glass breakage, (ii) metal folding, (iii) contact thud, and (iv) tires screeching. The crash event file may contain crash event information generated prior to a claim being filed with an insurance carrier.

The notice of the possible crash event communicates from the crash event notifier electronically within the communications network, for example, via an API operative on a crash event detector or by direct data entry resulting from one of a phone call, a text message, or an electronic mail message.

The crash event servicer information may comprise a tow service provider with crash event information that includes at least the service request time, dispatch tower ID, tow service driver, tow vehicle ID, and arrival time communicated through the network to the communications hub. Vehicle disposition information includes alternatively a motor vehicle disposition site for delivery by the tow service provider of an undrivable motor vehicle as instructed by the communications hub 186 and crash event information including delivery date, time, and recipient of the undrivable motor vehicle to the motor vehicle disposition site communicated through the network to the communications hub. The claims servicer associated with an insurance carrier that provides insurance for the undrivable motor vehicle communicates crash event information through the network to the communications hub including policy holder identification and disposition information for the undrivable motor vehicle. The motor vehicle disposition site comprises for example, a repair center for evaluating repair and repairing the undrivable motor vehicle, in response to instructions communicated from the communications hub by the claims servicer. Upon a determination of salvage, the claim servicer in consultation with the vehicle owner, may direct transfer of the undrivable motor vehicle to a salvage yard and communicate such disposition as crash event information including date, time, and recipient of the undrivable motor vehicle to the salvage yard communicated through the network to the communications hub by the claims servicer.

In an embodiment, the crash event information further comprises a crash event notifier source identification, a motor vehicle identification, a crash event temporal information of date, time and location, a plurality of crash event metadata comprising the motion signals, the crash sound signals, and an algorithmic scoring of said signals, one or more crash response confirmations, recordings of telephone calls with emergency police services, confirmations of crash event communications initiated to contacts including family, employer, and insurance provider servicers, motor vehicle tow response temporal information of time and date of request, dispatch, arrival, departure from crash site, arrival at vehicle disposition site, motor vehicle service provider identification, tow vehicle identification.

Such information may be extracted from the source of the first notice of loss event notifier. For example, the data may be most complete when the event notice comes directly from the crash detection application operative on the mobile communications device discussed above or from an imbedded SDK. The extracted information includes the notice source identifier for tracking and follow-up purposes, as appropriate a mobile communications device identifier, the vehicle identification (VIN number), event temporal information including date, time and location, including for example, GPS information, crash metadata including but not limited to, crash severity consisting of accelerometer, gyroscopic, audio and algorithmic scoring. The communications hub 186 further receives and stores user crash confirmation responses, including escalation levels, for example, evaluation and approvals of motor vehicle status, repair, parts order and delivery, salvage, and disposition including transferor, receipt, and release by authorized parties. Recorded emergency telephone calls, for example to local police services using a 911 number, may be retained within the records of the communications hub 186. Similarly, the communications hub 186 maintains records regarding event communications to authorized contacts of the operator, including communications initiated to family, employer, agents or other appropriate individuals. Tow or other assistance requests information may be maintained, including but not limited to the request time, dispatched tower ID, driver, vehicle ID, and arrival time. Other sources of information related to the crash event and its resolution may be integrated as appropriate. For example, the comprehensive crash event and claims servicing system may further comprise information as to the policyholder including name, address, phone number and electronic mail address, such as may be communicated to the communications hub by the claims servicer. The insured information further includes at least one motor vehicle information insured by the insurance carrier, including for each motor vehicle an associated VIN, license tag number, vehicle make, vehicle model, vehicle year, and vehicle color; and insurance policy information including policyholder identification, a motor vehicle information number, the insurance carrier, the policy number, the insurance agent identifier, insurance coverage, and identification of other drivers covered by the insurance policy. The other insured drivers information including for each a name, address, one or more phone number including primary, cell phone, or office secondary, electronic mail address, one or more motor vehicles number; emergency contacts information including name, relationship, and contact mode (telephone, email, SMS text). With reference to FIG. 11, the tow vehicles operated by the service responder preferably are equipped with the plurality of imaging devices 252 mounted and operated for providing images of conditions in selected directions around the tow vehicle. A first embodiment provides respective imaging devices mounted for front, rear, and opposing lateral side images. Alternatively, the tow vehicle may include in-cab imaging devices for imaging the operation of the tow vehicle and/or outwardly for the travel or surroundings of the tow vehicle. Such imaging devices typically include temporal data (date and time) associated with the video imaging. The crash event information further comprises respective videos and still pictures of the imaging devices depicting (a) drive-up to the crash accident scene, (b) the damaged vehicle and crash accident scene, and (c) towing process including loading at the crash site, intermediate transport, and unloading at the destination. Further, the crash event information may include textual information about the damaged vehicle and the accident scene, towed vehicle destination, and towed vehicle indentation.

Alternatively, imaged videos may be analyzed for determining an identification of a "move over" violation by a passing motor vehicle. For example, accident scene information is derived from the mobile communications device configured with the accident detection application discussed above or embedded SDK, in-network video equipped tow trucks operated by crash event responders, tow truck drivers equipped with imaging application software operable on smart phones or other mobile communication devices such as tablets, and audio messaging and/or textual descriptions such as from the insured driver and the tow driver.

The disclosed communications hub 186 coordinates the processing of the insurance claim and vehicle disposition information, which information is derived by integrations to the data base, from the fleet bub or by other electronic means via appropriate APIs or by direct data entry resulting from phone calls, text messages, emails or other human interfaced means from the various persons, entities and services involved in the claims process. These include the policyholder, the insurance agent, the repair facilities and salvage and auction facilities that receive the motor vehicle through instructions of authorized entities (typically, the motor vehicle owner in conjunction with the claims servicer), as well as towing services (which companies may be independent or networked within the disclosed comprehensive crash event and claims servicing system, and including a two dispatch service), insurance provider claims department or servicer, the claims appraiser/adjuster, crash investigator and reconstruction services, medical services providers, temporary car or vehicle providers (car rental services), customer experience/customer service providers (such as insurance provider or other agencies that interact between the servicer and the insured or driver).

The communications network of the comprehensive crash event and claims servicing system provides communications facilities and protocols on a bidirectional basis, to obtain data and claim status from all persons and entities involved in the crash/tow/claim solution, including but not limited to, email, voicemail, video, SMS text, still frame photographs, and text rendered from audio narrative. The communications bub 186 maintains and operates APIs to facilitate direct integration with claims processing software already in place at the insurance company or other crash/tow/claim entities. The claims processing servicer may grant the consumer or selected crash/tow/claim participant access to portions of the communications hub database and information appropriate for the respective role in the claims solution process. The communications hub 186 provides seamless network access to the database across multiple devices including computers, tablets and smart phones. The automated, programmable, work-flow infrastructure facilitates efficient processing of claims-related tasks, data management and communication requirements among all the participants in the crash/tow/claim solution for resolving motor vehicle accident event claims.

In that regard, the communications hub 186 further provides data and communications capabilities for the range of claims resolution functions and services. The communications hub 186 supports a vehicle disposition triage center that may be used by the insurance services provider, or an authorized third party entity, to review the real time videos, pictures, tow driver's comments, and crash event meta data in an evaluation of the claims, for example, a determination whether the vehicle is a total loss or is repairable, and thus choose an appropriate destination for the damaged vehicle transported from the accident site. The communications hub 186 supports a tow vehicle monitoring center whereby the computer and video equipment on the tow trucks is periodically checked for proper operation, including dirty and inoperative cameras. This is particularly useful within networked tow service providers to maintaining standards and quality. The collected information facilitates an automated process for creating crash incident reports for use appropriate entities in the crash/tow/claim solution. The communications hub supports periodic automated quality checks of the crash detection application operated on the mobile communications device or contained in an embedded SDK. The videos captured during the towing cycle proximate an accident scene supports subsequent analysis of the capture of "move over" violations, to encourage increased safety to crash event responders at a crash accident scene.

Computer networks suitable for use with the embodiments described herein include local area networks (LAN), wide area networks (WAN), Internet, or other connection services and network variations such as the world wide web, the public internet, a private internet, a private computer network, a public network, a mobile network, a cellular network, a value-added network, and the like. Computing devices coupled or connected to the network may be any microprocessor-controlled device that permits access to the network, including terminal devices, such as personal computers, workstations, servers, mini computers, main-frame computers, laptop computers, mobile computers, palm top computers, hand held computers, mobile phones, TV set-top boxes, or combinations thereof. The computer network may include one of more LANs, WANs, Internets, and computers. The computers may serve as servers, clients, or a combination thereof.

The crash detection, response and reporting apparatus and method can be a component of a single system, multiple systems, and/or geographically separate systems. The crash detection, response and reporting apparatus and method can also be a subcomponent or subsystem of a single system, multiple systems, and/or geographically separate systems. The crash detection, response and reporting components can be coupled to one or more other components (not shown) of a host system or a system coupled to the host system.

One or more components of the crash detection, response and reporting apparatus and method and/or a corresponding interface, system or application to which the crash detection, response and reporting apparatus is coupled or connected includes and/or runs under and/or in association with a processing system. The processing system includes any collection of processor-based devices or computing devices operating together, or components of processing systems or devices, as is known in the art. For example, the processing system can include one or more of a portable computer, portable communication device operating in a communication network, and/or a network server. The portable computer can be any of a number and/or combination of devices selected from among personal computers, personal digital assistant devices, portable computing devices, and portable communication devices, but is not so limited. The processing system can include components within a larger computer system.

The processing system of an embodiment includes at least one processor and at least one memory device or subsystem. The processing system can also include or be coupled to at least one database. The term "processor" as generally used herein refers to any logic processing unit, such as one or more central processing units (CPUs), digital signal processors (DSPs), application-specific integrated circuits (ASIC), etc. The processor and memory can be monolithically integrated onto a single chip, distributed among a number of chips or components, and/or provided by some combination of algorithms. The methods described herein can be implemented in one or more of software algorithm(s), programs, firmware, hardware, components, circuitry, in any combination.

The components of any system that include the crash detection, response and reporting apparatus and method can be located together or in separate locations. Communication paths couple the components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or backend networks, and the Internet. Furthermore, the communication paths include but are not limited to, removable fixed mediums like floppy disks, hard disk drives, and CD-ROM disks, as well as flash RAM, Universal Serial Bus (USB) connections, RS-232 connections, telephone lines, buses, and electronic mail messages.

Aspects of the crash detection, response and reporting apparatus and corresponding systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the crash detection, response and reporting apparatus and method and corresponding systems and methods include: microcontrollers with memory (such as electronically erasable programmable read only memory (EEPROM)), embedded microprocessors, firmware, software, etc. Furthermore, aspects of the crash detection, response and reporting apparatus and method and corresponding systems and methods may be embodied in microprocessors having software-based circuit emulation, discrete logic (sequential and combinatorial), custom devices, fuzzy (neural) logic, quantum devices, and hybrids of any of the above device types. Of course, the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that any system, method, and/or other components disclosed herein may be described using computer aided design tools and expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of the above described components may be processed by a processing entity (e.g., one or more processors) within the computer system in conjunction with execution of one or more other computer programs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the crash detection, response and reporting apparatus and method and the corresponding systems and methods is not intended to be exhaustive or to limit the systems and methods to the precise forms disclosed. While specific embodiments of, and examples for, the crash detection, response and reporting apparatus and method and corresponding systems and methods are described herein for illustrative purposes, various equivalent modifications are possible within the scope of the systems and methods, as those skilled in the relevant art will recognize. The teachings of the crash detection, response and reporting apparatus and method and corresponding systems and methods provided herein can be applied to other systems and methods, not only for the systems and methods described above.

The elements and actions of the various embodiments described above can be adapted, modified, and combined to provide further embodiments in accordance with the present invention of the crash detection, response and reporting apparatus and methods and corresponding systems and methods in light of the above detailed description. While this invention has been described in detail with particular reference to illustrative, non-limiting embodiments thereof, the principles and modes of operation of the present invention have been described in the foregoing specification. The invention is not to be construed as limited to the particular forms disclosed because these are regarded as illustrative rather than restrictive. Moreover, those skilled in the art may make modifications, variations and changes thereto without departure from the spirit and scope of the invention as described by the following claims.

What is claimed is:

1. A communications hub providing a repository for resolution of undrivable motor vehicle crash events, comprising:

a plurality of mobile communications devices, each associated with a respective one of the plurality of drivers and configured with a sensor that generates a motion signal responsive to motion of the mobile communications device and a sound receiver for receiving a sound signal of sound proximate the mobile communications device;

the mobile communications device configured with software instructions that upon execution monitors for an occurrence of a crash event by periodically interrogating (a) the motion signal to determine whether a change in motion exceeds a predetermined motion threshold and or (b) the sound signal to determine whether a sequence of sensed sound signals within a predetermined period matches one or more crash sound indicators of (i) glass breakage, (ii) metal folding, (iii) contact thud, and (iv) tires screeching;

each mobile communications device comprising a display that upon determining the occurrence of the crash incident displays a possible event window for selection of one of (a) to return the mobile communications device to monitoring for the occurrence of the crash incident and (b) to confirm the crash incident;

the mobile communications device, upon (a) confirmation of the crash incident or (b) upon a failure of selection of one of the selectable options within a predetermined period, the mobile communications device communicating by a communications network an identifier associated with the mobile communications device and crash incident information of a location data, date and time to the tracking and dispatch center;

the tracking and dispatch center having a computer processor configured with an electronic memory device that maintains driver information of driver name, address, insurance servicer and policy number for each of the plurality of drivers and further comprising for each mobile communications device a repository of:

vehicle crash incident information communicated by the mobile communications device and associated with a motor vehicle; and one or more vehicle crash data records, each said vehicle crash record containing data provided by one of a plurality of crash event servicers;

the plurality of crash event servicers comprising:

(i) at least one response servicer for dispatching by the tracking and dispatch center to a site of the crash incident based on the location data, the response servicer providing an imaging device and a communications device, whereby images received by the imaging device communicate by the communications device through the network to the tracking and dispatch center for recording in the repository; and (ii) a claims servicer that receives from the tracking and dispatch center notice of the identifier and crash incident information, the claims service center configured for servicing an insurance claim arising from the crash event using the vehicle crash incident information and the vehicle crash data records communicated to the tracking and dispatch center and recorded in the repository.

2. The communications hub as recited in claim 1, further comprising a secure portal for access by the plurality of crash event servicers for communicating motor vehicle data for entry to the repository.

3. The communications hub as recited in claim 2, wherein the plurality of crash event servicers further comprises a repair servicer for receiving the motor vehicle involved in the crash event, whereby the motor vehicle is evaluated for possible repair, which disposition and evaluation is communicated to the repository.

4. The communications hub as recited in claim 3, wherein the repair servicer is one of a plurality of repair servicers that are affiliated by the claims servicers for the receipt, evaluation, and repair of motor vehicles.

5. The communications hub as recited in claim 3, further comprising a parts supplier for distribution of motor vehicle repair parts to the repair servicer, which distribution is communicated to the repository.

6. The communications hub as recited in claim 2, wherein the plurality of crash event servicers further comprises a salvage facility for receiving the motor vehicle upon a determination of unreparability, which disposition is communicated to the repository.

7. The communications hub as recited in claim 2, wherein the plurality of crash event servicers further comprises a motor vehicle rental servicer for providing temporary use of a rental motor vehicle during resolution of the damages claim by the claims servicer, whereby the providing of the rental motor vehicle is communicated to the repository.

8. The communications hub as recited in claim 1, wherein the plurality of crash event servicers further comprises an insurance agency that provides insurance services to at least one of the plurality of drivers.

9. The communications hub as recited in claim 1, wherein the driver information further comprises one or more contact identifiers, each said one or more contact identifiers for a contact person associated with a respective one of the plurality of drivers; and further comprising the computer processor configured to contact said respective contact person based on the one or more contact identifiers, which contact communication is communicated to the repository.

10. The communications hub as recited in claim 2, wherein the plurality of crash event servicers further comprises a motor vehicle accident reconstruction service for engineering analysis of the crash event, whereby the engineering analysis is communicated to the repository.

11. The communications hub as recited in claim 1, wherein the response servicer further provides a vehicle transporter, whereby the crashed motor vehicle may be transported from the crash location.

12. The communications hub as recited in claim 1, wherein the imaging device is operable selectively for video and for single frame images.

13. The communications hub as recited in claim 1, wherein the sensor comprises an accelerometer that generates an acceleration signal as indicative of the motion of the mobile communications device.

14. The communications hub as recited in claim 1, wherein the sensor comprises a gyroscope that generates an angular rotation signal as indicative of the motion of the mobile communications device.

15. The communications hub as recited in claim 1, wherein the imaging device of the response servicer is wireless.

16. The communications hub as recited in claim 1, wherein the mobile communications device further comprising an electronic memory device configured for receiving and storing crash incident information of the motion signal and the crash sound signals for a predetermined period preceding the possible crash event.

17. The communications hub as recited in claim 16, further comprising the continuous recording database maintaining a trailing portion for a second predetermined period after the possible crash event.

18. The communications hub as recited in claim 1, wherein the mobile communications device is configured to interrogate both the motion signal and the crash sound signal in determining whether an occurrence of a possible crash event occurred based on the change in motion exceeding the predetermined motion threshold and the crash sound signal matches one or more of crash sound indicators of (i) glass breakage, (ii) metal folding, (iii) contact thud, and (iv) tires screeching.

19. The communications hub as recited in claim 1, wherein the mobile communications device configured for generating video files imaging the crash event automatically upon the failure of the selection of one of the selectable options or selectively after confirmation of the crash event, said video files communicated to the tracking and dispatch center.

20. The communications hub as recited in claim 1, wherein the mobile communication devices further configured, upon failure to respond within the first predetermined period, for making a second alert with the mobile communications device for a response within a second predetermined period to (i) return to monitoring or (ii) to confirm the possible crash event.

21. The communications hub as recited in claim 20, wherein the second alert comprises communicating an audible message as to the possible crash event and the response comprises a selectable voice option (i) to return monitoring or (ii) to confirm the possible crash event.

22. A comprehensive crash event and claims servicing system, comprising:
   a telecommunications network;
   a communications hub having a transceiver for receiving and communicating through the network crash event information from at least one crash event servicer and maintaining said crash event information in an electronic database operatively engaged with the communications hub;
   a crash event notifier that communicates a notice of a crash event to the communications hub to initiate a crash event file for maintaining the crash event information associated with the crash event,
   wherein the crash event notifier comprises one of a crash event detector device, a crash event SDK imbedded in a consumer software application operated by an insurance carrier, a motor club servicer, a cell phone network provider, a motor vehicle OEM monitoring servicer, a telecommunications report, a towing dispatch servicer, and a towing service provider (private or municipal); and
   said crash event file associated with an identifier associated with the notice of the crash event,
   whereby said crash event information being accessible for resolution of personal and property claims arising from the crash event.

23. The comprehensive crash event and claims servicing system as recited in claim 22, wherein said crash event detector device comprises a mobile communications device configured with software instructions that upon execution monitors for the occurrence of the crash event by periodically interrogating (a) a motion signal of a sensor responsive to motion and (b) a sound signal of a sound sensor responsive to sound signals within a predetermined period matching crash sound indicators.

24. The comprehensive crash event and claims servicing system as recited in claim 23, wherein the crash sound indicators comprise one or more of (i) motor vehicle glass breakage, (ii) metal folding, (iii) contact thud, and (iv) tires screeching.

25. The comprehensive crash event and claims servicing system as recited in claim 22, wherein said crash event file contains crash event information generated prior to a claim being filed with an insurance carrier.

26. The comprehensive crash event and claims servicing system as recited in claim 22, wherein the notice of the crash event communicates electronically via an API operative on a crash event detector or by direct data entry resulting from one of a phone call, a text message, or an electronic mail message.

27. The comprehensive crash event and claims servicing system as recited in claim 22, wherein said crash event servicer further comprises:
    a tow service provider with crash event information including at least service request time, dispatch tower ID, tow service driver, tow vehicle ID, and arrival time communicated through the network to the communications hub; and
    a motor vehicle disposition site for delivery by the tow service provider of an undrivable motor vehicle as instructed by the communications hub and crash event information including delivery date, time, and recipient of the undrivable motor vehicle to the motor vehicle disposition site communicated through the network to the communications hub; and
    a claims servicer associated with an insurance carrier providing insurance for the undrivable motor vehicle and communicating crash event information through the network to the communications hub including policy holder identification and disposition information for the undrivable motor vehicle.

28. The comprehensive crash event and claims servicing system as recited in claim 27, wherein the motor vehicle disposition site comprises a repair center for evaluating repair and repairing the undrivable motor vehicle, in response to instructions communicated from the communications hub by the claims servicer.

29. The comprehensive crash event and claims servicing system as recited in claim 28, further comprising a salvage yard and communicating crash event information including date, time, and recipient of the undrivable motor vehicle to the salvage yard communicated through the network to the communications hub by the claims servicer.

30. The comprehensive crash event and claims servicing system as recited in claim 27, wherein the crash event detector device comprises a mobile telecommunications device configured with software instructions that upon execution monitors for an occurrence of a crash event by periodically interrogating (a) the motion signal to determine whether a change in motion exceeds a predetermined motion threshold and or (b) the sound signal to determine whether a sequence of sensed sound signals within a predetermined period matches crash sound indicators of one or more of (i) motor vehicle glass breakage, (ii) metal folding, (iii) contact thud, and (iv) tires screeching.

31. The comprehensive crash event and claims servicing system as recited in claim 27, wherein crash event information further comprises a crash event notifier source identification, a motor vehicle identification, a crash event temporal information of date, time and location, a plurality of crash event metadata comprising the motion signals, the sound signals, and an algorithmic scoring of said signals, one or more crash response confirmations, recordings of telephone calls with emergency police services, confirmations of crash event communications initiated to registered related contacts, motor vehicle tow response temporal information of time and date of request, dispatch, arrival, departure from crash site, arrival at vehicle disposition site, motor vehicle service provider identification, tow vehicle identification.

32. The comprehensive crash event and claims servicing system as recited in claim 27, wherein said crash event information further comprises:
    policyholder information including name, address, phone number and electronic mail address communicated to the communications hub by the claims servicer;
    at least one motor vehicle information insured by the insurance carrier, including for each motor vehicle an associated VIN, license tag number, vehicle make, vehicle model, vehicle year, and vehicle color; and
    insurance policy information including policyholder identification, a motor vehicle information number, the insurance carrier, the policy number, the insurance agent identifier, insurance coverage, and identification of other drivers covered by the insurance policy.

33. The comprehensive crash event and claims servicing system as recited in claim 32 wherein said other insured drivers information including for each a name, address, one or more phone number including primary, cell phone, or office secondary, electronic mail address, one or more motor vehicles number; emergency contacts information including name, relationship, and contact mode (telephone, email, SMS text).

34. The comprehensive crash event and claims servicing system as recited in claim 27, wherein said tow vehicle of said tow service provider further comprises a plurality of imaging devices mounted on said tow vehicle for providing images imaged by said respective imaging devices; and said crash event information further comprises respective videos and still pictures of the imaging devices depicting (a) drive-up to the crash accident scene, (b) the damaged vehicle and crash accident scene, (c) towing process including loading and unloading at the destination.

35. The comprehensive crash event and claims servicing system as recited in claim 34, wherein said crash event information further comprises textual information about the damaged vehicle and the accident scene, towed vehicle destination, and towed vehicle identification.

36. The comprehensive crash event and claims servicing system as recited in claim 34, wherein the imaged videos are analyzed for determining an identification of a "move over" violation by a passing motor vehicle.

37. A method of resolving claims arising from undrivable motor vehicle crash events via a communications hub repository service, comprising the steps of:
    (a) providing a plurality of mobile communications devices, each associated with a respective one of the plurality of drivers and configured with a sensor that generates a motion signal responsive to motion of the mobile communications device and a sound receiver for receiving a sound signal of sound proximate the mobile communications device;
    (b) configuring the mobile communications device with software instructions that upon execution monitors for an occurrence of a crash event by periodically interrogating (i) the motion signal to determine whether a change in motion exceeds a predetermined motion threshold and or (b) the sound signal to determine whether a sequence of sensed sound signals within a predetermined period matches crash sound indicators of one or more of (i) motor vehicle glass breakage, (ii) metal folding, (iii) contact thud, and (iv) tires screeching;

(c) upon determining by a respective mobile communications device the occurrence of the crash incident, displaying thereon a possible event window for selection of one of (i) to return the mobile communications device to monitoring for the occurrence of the crash incident and (ii) to confirm the crash incident;

(d) upon (i) confirmation of the crash incident or (ii) upon a failure of selection of one of the selectable options within a predetermined period, communicating by the mobile communications device within a communications network an identifier associated with the mobile communications device and crash incident information of a location data, date and time to a tracking and dispatch center having a computer processor configured with an electronic memory device that maintains driver information of driver name, address, insurance servicer and policy number for each of the plurality of drivers;

(e) receiving and storing in a repository of the tracking and dispatch center,
vehicle crash incident information communicated by the mobile communications device and associated with the motor vehicle; and
one or more vehicle crash data records, each said vehicle crash record containing data provided by one of a plurality of crash event servicers;
the plurality of crash event servicers comprising:
(i) at least one response servicer for dispatching by the tracking and dispatch center to a site of the crash incident based on the location data, the response servicer providing an imaging device and a communications device; and
(ii) a claims servicer;

(f) communicating by the communications device images received by the imaging device through the network to the tracking and dispatch center for recording in the repository; and (g) servicing by the claims service center an insurance claim arising from the crash event using the vehicle crash incident information and the vehicle crash data records communicated to the tracking and dispatch center and recorded in the repository.

38. A method of servicing claims with a comprehensive crash event and claims servicing system, comprising the steps of:
(a) providing a telecommunications network;
(b) establishing a communications hub with a transceiver for receiving and communicating through the network crash event information from at least one crash event servicer and maintaining said crash event information in an electronic database operatively engaged with the communications hub;
(c) communicating from a crash event notifier that upon determination of a crash event, notice of the crash event to the communications hub to initiate a crash event file for maintaining the crash event information associated with the crash event, said crash event file associated with an identifier associated with the notice of the crash event,
wherein the crash event notifier comprises one of a crash event detector device, a crash event SDK imbedded in a consumer software application operated by an insurance carrier, a motor club servicer, a cell phone network provider, a motor vehicle OEM monitoring servicer, a telecommunications report, a towing dispatch servicer, and a towing service provider (private or municipal); and
(d) providing access to said crash event information for resolution of personal and property claims arising from the crash event.

39. The method of servicing claims as recited in claim 38, wherein the notice of the crash event communicates electronically via an API operative on a crash event detector or by direct data entry resulting from one of a phone call, a text message, or an electronic mail message.

40. A comprehensive crash event and claims servicing system, comprising:
a telecommunications network;
a communications hub having a transceiver for receiving and communicating through the network crash event information from at least one crash event servicer and maintaining said crash event information in an electronic database operatively engaged with the communications hub;
a crash event notifier that communicates notice of a crash event to the communications hub to initiate a crash event file for maintaining the crash event information associated with the crash event; and
said crash event file associated with an identifier associated with the notice of the crash event and contains crash event information generated prior to a claim being filed with an insurance carrier,
whereby said information being accessible for resolution of personal and property claims arising from the crash event.

41. A comprehensive crash event and claims servicing system, comprising:
a telecommunications network;
a communications hub having a transceiver for receiving and communicating through the network crash event information from at least one crash event servicer and maintaining said crash event information in an electronic database operatively engaged with the communications hub;
a crash event notifier that communicates notice of a crash event to the communications hub to initiate a crash event file for maintaining crash event information associated with the crash event;
wherein the notice of the crash event communicates electronically via an API operative on a crash event detector or by direct data entry resulting from one of a phone call, a text message, or an electronic mail message; and
said crash event file associated with an identifier associated with the notice of the crash event,
whereby said crash event information being accessible for resolution of personal and property claims arising from the crash event.

42. A comprehensive crash event and claims servicing system, comprising:
a telecommunications network;
a communications hub having a transceiver for receiving and communicating through the network crash event information from at least one crash event servicer and maintaining said crash event information in an electronic database operatively engaged with the communications hub;
a crash event notifier that communicates notice of a possible crash event to the communications hub to initiate a crash event file for maintaining the crash event information associated with the crash event; and said crash event file associated with an identifier associated with the notice of the crash event, wherein said one or more crash event servicer further comprises:

a tow service provider with crash event information including at least service request time, dispatch tower ID, tow service driver, tow vehicle ID, and arrival time communicated through the network to the communications hub;

a motor vehicle disposition site for delivery by the tow service provider of an undrivable motor vehicle as instructed by the communications hub and crash event information including delivery date, time, and recipient of the undrivable motor vehicle to the motor vehicle disposition site communicated through the network to the communications hub; and a claims servicer associated with an insurance carrier providing insurance for the undrivable motor vehicle and communicating crash event information through the network to the communications hub including policy holder identification and crash event information for the undrivable motor vehicle, whereby said crash event information being accessible for resolution of personal and property claims arising from the crash event.

* * * * *